United States Patent
Okita et al.

(10) Patent No.: US 9,975,247 B2
(45) Date of Patent: May 22, 2018

(54) POSITION DETECTION APPARATUS, SUBSTRATE PROCESSING APPARATUS, POSITION DETECTION METHOD AND SUBSTRATE PROCESSING METHOD

(71) Applicant: SCREEN Holdings Co., Ltd., Kyoto (JP)

(72) Inventors: Yuji Okita, Kyoto (JP); Hiroaki Kakuma, Kyoto (JP); Hiroshi Sano, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 320 days.

(21) Appl. No.: 14/793,794

(22) Filed: Jul. 8, 2015

(65) Prior Publication Data

US 2016/0091892 A1 Mar. 31, 2016

(30) Foreign Application Priority Data

Sep. 26, 2014 (JP) ................................. 2014-197065

(51) Int. Cl.
| | | |
|---|---|---|
| G06K 9/00 | (2006.01) | |
| B25J 9/16 | (2006.01) | |
| G06T 7/73 | (2017.01) | |

(52) U.S. Cl.
CPC .............. *B25J 9/1674* (2013.01); *G06T 7/74* (2017.01); *G05B 2219/40611* (2013.01); *G05B 2219/45031* (2013.01); *G06T 2207/30164* (2013.01)

(58) Field of Classification Search
None
See application file for complete search history.

(56) References Cited

U.S. PATENT DOCUMENTS

| | | | | |
|---|---|---|---|---|
| 5,640,243 A | * | 6/1997 | Koitabashi | ................ G03F 9/70 250/548 |
| 5,966,201 A | * | 10/1999 | Shiraishi | ................... G03F 9/70 355/53 |

(Continued)

FOREIGN PATENT DOCUMENTS

| | | |
|---|---|---|
| JP | 10-135100 | 5/1998 |
| JP | 11-005056 | 1/1999 |

(Continued)

OTHER PUBLICATIONS

Office Action dated Jan. 31, 2017 in corresponding Korean Patent Application No. 10-2015-0072877.

(Continued)

*Primary Examiner* — Jayesh A Patel
(74) *Attorney, Agent, or Firm* — Ostrolenk Faber LLP

(57) ABSTRACT

A position detection apparatus detects the positions of movable parts 33, 43, 53 which are movable within processing space SP inside a chamber 90. An imaging device 72 shoots reference sections 61-64, which are disposed inside the chamber 90 and the positions of which are known, and the movable parts and accordingly obtains an original image. An image processor 86 executes image processing which is for detecting the movable parts and the reference sections from the original image. An image detector 86 detects the positions of the movable parts within the processing space in accordance with position information which is indicative of the positions of the movable parts and the reference sections within the original image. It is possible to accurately detect the positions of the movable parts while suppressing the influence exerted by deviation of the imaging device.

20 Claims, 15 Drawing Sheets

(56) References Cited

U.S. PATENT DOCUMENTS

| | | | |
|---|---|---|---|
| 7,003,758 B2* | 2/2006 | Ye | G03F 7/705 378/35 |
| 7,620,307 B2* | 11/2009 | Katayama | G02B 7/08 348/357 |
| 9,417,519 B2* | 8/2016 | Mulkens | G03F 1/70 |
| 2001/0055063 A1* | 12/2001 | Nagai | G01S 5/16 348/116 |
| 2002/0192598 A1* | 12/2002 | Hirayanagi | G03F 1/84 430/311 |
| 2003/0156757 A1* | 8/2003 | Murakawa | G06K 9/4609 382/195 |
| 2003/0226951 A1* | 12/2003 | Ye | G03F 7/70591 250/208.1 |
| 2004/0028258 A1* | 2/2004 | Naimark | G06K 9/4609 382/103 |
| 2004/0095472 A1* | 5/2004 | Yoshida | H04N 5/235 348/208.12 |
| 2004/0257568 A1* | 12/2004 | Yamane | G03F 1/84 356/394 |
| 2005/0198600 A1* | 9/2005 | Hasegawa | G06F 17/5081 716/112 |
| 2005/0250022 A1* | 11/2005 | Kotani | G03F 1/36 430/5 |
| 2005/0276443 A1* | 12/2005 | Slamani | G06K 9/00208 382/103 |
| 2009/0059297 A1 | 3/2009 | Uemura | 358/1.18 |
| 2011/0032352 A1* | 2/2011 | Kanda | H04N 7/183 348/142 |
| 2011/0085180 A1* | 4/2011 | Beerens | G03F 7/70766 356/614 |
| 2014/0291512 A1* | 10/2014 | Nakatani | G01N 23/2258 250/307 |

FOREIGN PATENT DOCUMENTS

| | | |
|---|---|---|
| JP | 11-131231 | 5/1999 |
| JP | 2002-135644 | 5/2002 |
| JP | 2006-228029 A | 8/2006 |
| JP | 2006-235699 | 9/2006 |
| JP | 2006-268032 | 10/2006 |
| JP | 2006-284890 | 10/2006 |
| JP | 2007-196301 | 8/2007 |
| JP | 2013-115384 | 6/2013 |
| JP | 2013-206983 | 10/2013 |
| WO | WO 2006/090914 A1 | 8/2006 |
| WO | WO 2008153301 A1 * | 12/2008 ......... G01R 31/2891 |

OTHER PUBLICATIONS

Office Action dated Jul. 15, 2016 in corresponding Korean Patent Application No. 10-2015-0072877.

Notice of Allowance dated Aug. 31, 2017 in corresponding Korean Patent Application No. 10-2015-0072877.

* cited by examiner

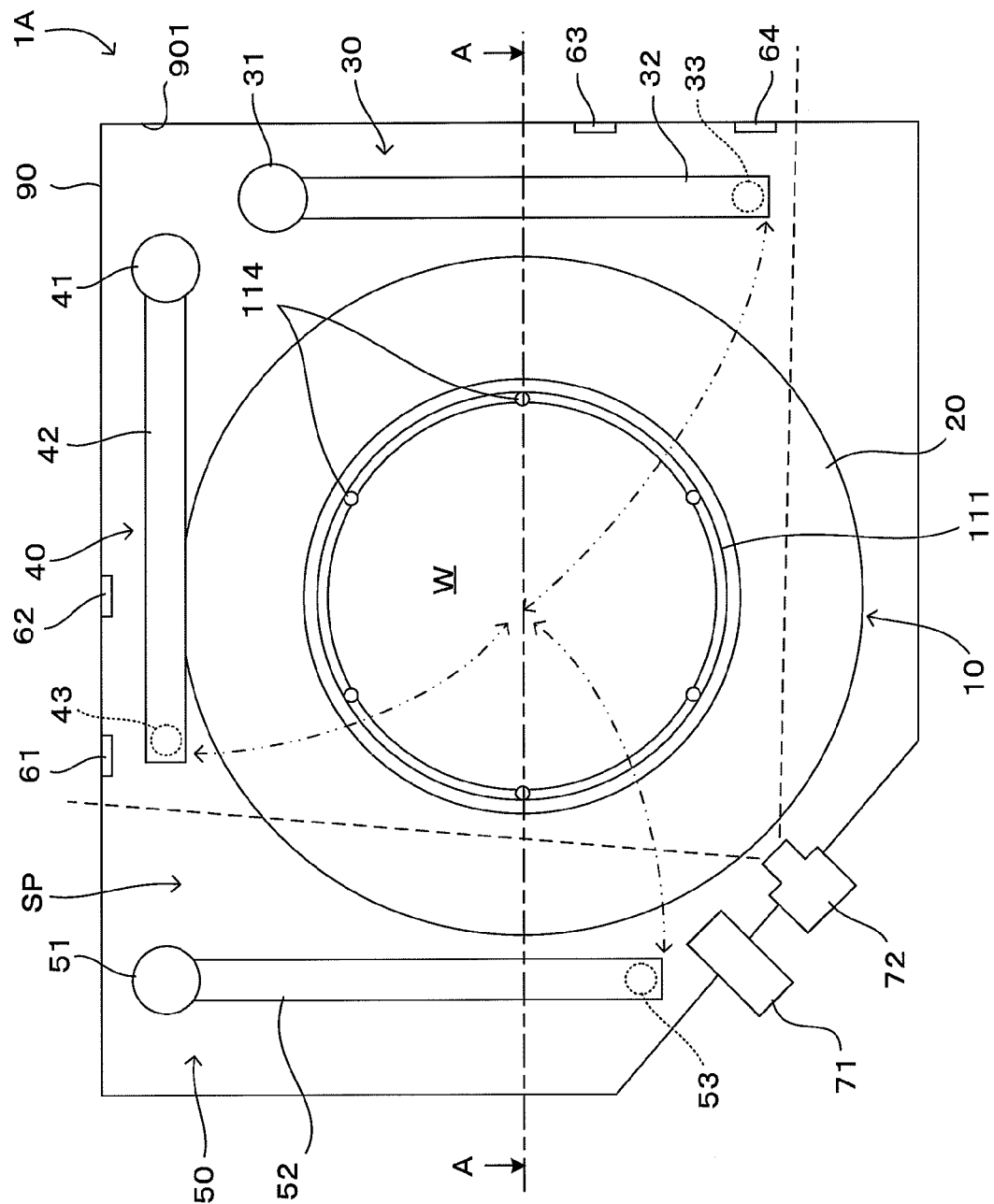
F I G. 2

| MARK | | X-COORDINATE | Y-COORDINATE | ROTATION ANGLE | X-SCALE | Y-SCALE |
|---|---|---|---|---|---|---|
| 1 | REF. VALUE | 10.00 | 110.00 | 0.00 | 100.00 | 100.00 |
| | ACTUAL VALUE | 15.00 | 105.00 | 15.00 | 105.00 | 105.00 |
| | DIFFERENCE | +5.00 | -5.00 | +15.00 | +5.00 | +5.00 |
| 2 | REF. VALUE | 120.00 | 10.00 | 0.00 | 100.00 | 100.00 |
| | ACTUAL VALUE | 125.00 | 5.00 | 15.00 | 105.00 | 105.00 |
| | DIFFERENCE | +5.00 | -5.00 | +15.00 | +5.00 | +5.00 |
| 3 | REF. VALUE | 530.00 | 20.00 | 0.00 | 100.00 | 100.00 |
| | ACTUAL VALUE | 520.00 | 5.00 | 30.00 | 95.00 | 95.00 |
| | DIFFERENCE | -10.00 | -15.00 | +30.00 | -5.00 | -5.00 |
| 4 | REF. VALUE | 620.00 | 150.00 | 0.00 | 100.00 | 100.00 |
| | ACTUAL VALUE | 630.00 | 80.00 | 30.00 | 95.00 | 95.00 |
| | DIFFERENCE | +10.00 | -70.00 | +30.00 | -5.00 | -5.00 |

\*REF. VALUE=REFERENCE VALUE
\*ACTUAL VALUE=ACTUAL MEASUREMENT VALUE

| ITEM | UNIT | INPUT VALUE |
|---|---|---|
| SEARCH AREA | PIXEL | (0, 100), (640, 350) |
| SIZE OF ELLIPSE | mm | 250<R<350 |

| ITEM | UNIT | RESULT |
|---|---|---|
| CENTER COORDINATE OF ELLIPSE | PIXEL | (350, 250) |
| SIZE (X-DIRECTION) | mm | 310 |
| SIZE (Y-DIRECTION) | mm | 280 |

|  | X-COORDINATE | Y-COORDINATE | ROTATION ANGLE | X-SCALE | Y-SCALE |
|---|---|---|---|---|---|
| MARK 1 | 10.00 | 110.00 | 0.00 | 100.00 | 100.00 |
| MARK 2 | 120.00 | 10.00 | 0.00 | 100.00 | 100.00 |
| MARK 3 | 530.00 | 20.00 | 0.00 | 100.00 | 100.00 |
| MARK 4 | 620.00 | 150.00 | 0.00 | 100.00 | 100.00 |
| NOZZLE | 420.00 | 70.00 | 0.00 | 100.00 | 100.00 |

|  | X-COORDINATE | Y-COORDINATE | ROTATION ANGLE | X-SCALE | Y-SCALE |
|---|---|---|---|---|---|
| MARK 1 | −410.00 | +40.00 | 0.00 | 0.00 | 0.00 |
| MARK 2 | −300.00 | −60.00 | 0.00 | 0.00 | 0.00 |
| MARK 3 | +110.00 | −50.00 | 0.00 | 0.00 | 0.00 |
| MARK 4 | +200.00 | +80.00 | 0.00 | 0.00 | 0.00 |

|  | X-COORDINATE | Y-COORDINATE | ROTATION ANGLE | X-SCALE | Y-SCALE |
|---|---|---|---|---|---|
| MARK 1 | — | — | — | — | — |
| MARK 2 | 100.00 | 20.00 | 0.00 | 100.00 | 100.00 |
| MARK 3 | 510.00 | 30.00 | 0.00 | 100.00 | 100.00 |
| MARK 4 | 600.00 | 160.00 | 0.00 | 100.00 | 100.00 |
| NOZZLE | 400.00 | 80.00 | 0.00 | 100.00 | 100.00 |

|  | X-COORDINATE | Y-COORDINATE | ROTATION ANGLE | X-SCALE | Y-SCALE |
|---|---|---|---|---|---|
| MARK 1 | — | — | — | — | — |
| MARK 2 | −300.00 | −60.00 | 0.00 | 0.00 | 0.00 |
| MARK 3 | +110.00 | −50.00 | 0.00 | 0.00 | 0.00 |
| MARK 4 | +200.00 | +80.00 | 0.00 | 0.00 | 0.00 |

FIG. 15A

|  | X-COORDINATE | Y-COORDINATE | ROTATION ANGLE | X-SCALE | Y-SCALE |
|---|---|---|---|---|---|
| MARK 1 | — | — | — | — | — |
| MARK 2 | 100.00 | 20.00 | 0.00 | 100.00 | 100.00 |
| MARK 3 | 510.00 | 30.00 | 0.00 | 100.00 | 100.00 |
| MARK 4 | 600.00 | 160.00 | 0.00 | 100.00 | 100.00 |
| NOZZLE | 390.00 | 90.00 | 0.00 | 100.00 | 100.00 |

FIG. 15B

|  | X-COORDINATE | Y-COORDINATE | ROTATION ANGLE | X-SCALE | Y-SCALE |
|---|---|---|---|---|---|
| MARK 1 | — | — | — | — | — |
| MARK 2 | −290.00 | −70.00 | 0.00 | 0.00 | 0.00 |
| MARK 3 | +120.00 | −60.00 | 0.00 | 0.00 | 0.00 |
| MARK 4 | +210.00 | +70.00 | 0.00 | 0.00 | 0.00 |

POSITION DETECTION APPARATUS, SUBSTRATE PROCESSING APPARATUS, POSITION DETECTION METHOD AND SUBSTRATE PROCESSING METHOD

CROSS REFERENCE TO RELATED APPLICATION

The disclosure of Japanese Patent Application No. 2014-197065 filed on Sep. 26, 2014 including specification, drawings and claims is incorporated herein by reference in its entirety.

BACKGROUND OF THE INVENTION

1. Field of the Invention

The present invention is directed to a technique for detecting the position of a movable part which is disposed movably within processing space inside a chamber.

2. Description of the Related Art

During the processing of an object-to-be-processed which is a substrate for instance, for the purpose of controlling of ambient atmosphere or preventing a chemical solution from splattering, the object-to-be-processed and an apparatus for executing the processing may occasionally disposed within the same processing space inside a chamber. For such processing, the structure elements which form the apparatus must be located at appropriate positions.

When there is a movable member which is so structured to move within processing space, it is necessary to confirm whether the movable member is located at an appropriate position. For this purpose, position detection is executed which utilizes image processing which is subsequent to imaging of members which are located within the processing space, and whether the positions of the members are appropriate is then determined. However, the position of an imaging device itself such as a camera for imaging could be a deviated position. Several techniques to deal with such situations have been proposed (Patent Documents 1 through 6 for instance).

Patent Document 1: JP10-135100A
Patent Document 2: JP11-005056A
Patent Document 3: JP11-131231A
Patent Document 4: JP2006-268032A
Patent Document 5: JP2006-284890A
Patent Document 6: JP2002-135644A According to the techniques described in Patent Documents 1 through 3 among the patent documents above, a captured image is analyzed and deviation of a camera if any detected suspends processing. This is to avoid failure which can be otherwise caused by continuance of the processing in an abnormal condition. Meanwhile, the techniques described in Patent Documents 4 and 5 require installment of a mover mechanism which is for changing the posture of a camera. In response to detection of deviation of the camera, the mover mechanism moves the camera in an attempt to eliminate the deviation. While the technique according to Patent Document 6 is directed to detection of deviation of a camera, this patent document does not describe post-detection processing in detail.

In the event that a movable part is disposed inside a chamber for the purpose of executing some processing, it is reasonable to suspend the processing owing to deviation of the movable part. In contrast, suspension of processing owing to deviation of a camera (imaging device) should be avoided as much as possible in terms of the processing throughput. However, Patent Documents 1 through 3 and 6 are silent about a method which allows continuation of the processing even despite detected deviation of the imaging device. On the other hand, when the imaging device itself is equipped with the function of correcting deviation as described in Patent Documents 4 and 5, the structure of the apparatus becomes too complex and the processing cost grows.

Against this background, there is a need toward a technique for appropriately detecting the position of a movable part even despite deviation of an imaging device without spending a large cost. The conventional techniques described above however do not satisfy the need.

SUMMARY OF THE INVENTION

The invention has been made considering the problem above. Accordingly, an object of the invention is to provide a technique for accurately detecting the position of a movable part which is so disposed to move within processing space inside a chamber while suppressing the influence of deviation of an imaging device.

An aspect of the present invention is a position detection apparatus which detects a position of a movable part which is so disposed to move within processing space inside a chamber. The apparatus comprises: an imaging device which shoots a reference section, which is disposed inside the chamber and a position of which inside the chamber is known, and the movable part, thereby obtaining an original image; an image processor which performs image processing of the original image, thereby detecting the movable part and the reference section within the original image; and a position detector which detects the position of the movable part within the processing space based upon position information which is indicative of positions of the movable part and the reference section detected within the original image.

Another aspect of the present invention is a position detection method of detecting a position of a movable part which is movable within processing space inside a chamber. The method comprises: an imaging step of shooting a reference section, which is disposed inside the chamber in advance, and the movable part, thereby obtaining an original image; an image processing step of executing image processing for detecting the movable part and the reference section from the original image; and a position detecting step of detecting the position of the movable part within the processing space based upon position information which is indicative of positions of the movable part and the reference section detected within the original image.

In these aspects of the invention, the original images may be one image which contains both the reference section and the movable part. Further, the original image which contains the reference section and the original image which contains the movable part may be captured separately by the same imaging device.

Where such structures according to the invention are used, it is possible to estimate whether the imaging device which has captured the original images is deviated or not and the magnitude of deviation if any from the detected position within the original image of the reference section the installment position of which inside the chamber is known. In short, the position information concerning the reference section within the original image serves as an indicator which represents the amount of deviation of the imaging device inside the actual space (processing space) relative to the chamber which is used as the position reference. While the position of the movable part detected within the original image as well contains the deviation of the imaging device, it is possible to grasp the amount of deviation of the imaging device based upon the position information concerning the reference section. It is therefore possible to detect the position of the movable part within the processing space from the position information concerning the movable part and that concerning the reference section within the original image, and thus obtained detection result is highly accurate which is not influenced by deviation of the imaging device. That is, according to the invention, it is possible to accurately detect the position of the movable part which is so disposed to freely move within the processing space inside the chamber while suppressing the influence of deviation of the imaging device. In addition, since a structure for correcting the position of the imaging device is not necessary, it is possible to suppress the cost regarding the apparatus.

A third aspect of the present invention is a substrate processing apparatus which comprises: a chamber which has a processing space inside; a holder which holds a substrate to be processed inside the chamber; a processing device which is so structured to be able to move inside the chamber and which performs predetermined processing of the substrate; and a position detector which comprises the position detection apparatus described above, wherein the position detection apparatus detects the position of the processing device, which is regarded as the movable part, inside the chamber.

Further, a fourth aspect of the present invention is a substrate processing method which comprises the steps of: holding a substrate to be processed within processing space inside a chamber and setting a processing device, which is so structured to be able to move inside the chamber, to a predetermined position; executing the position detection method described above, detecting the position of the processing device inside the chamber while regarding the processing device as the movable part, and verifying the position of the processing device; and performing predetermined processing of the substrate using the processing device.

Where such structures according to the invention are used, the position of the processing device which processes the substrate is detected using the position detection technique described above. This enables execution of the processing of the substrate with confirmation that the position of the processing device which is movable inside the chamber is an appropriate position. This also makes it possible to avoid execution of inappropriate processing in a condition that the position of the processing device is inappropriate. Since it is possible to accurately detect the position of the processing device even despite deviation of the imaging device, it is possible to prevent hindrance to the processing of the substrate caused by deviation of the imaging device which does not directly contribute to the processing of the substrate.

According to the invention, even despite deviation of the imaging device, it is possible to grasp the amount of deviation based upon the position information concerning the reference section within the captured original image and accurately detect the position of the movable part within the processing space in accordance with thus grasped amount of deviation. As this position detection technique is applied to the processing of the substrate, it is possible to perform the processing with the processing device located at an appropriated position. The processing can be continued since it is possible to accurately detect the position even despite deviation of the imaging device, and as a mechanism for deviation correction is unnecessary, it is possible to suppress increase of the cost of the apparatus.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 2 is a plan view which shows the structure of one substrate processing unit;

FIGS. 15A and 15B are a third set of drawings showing the nozzle position detection method according to yet another embodiment.

DETAILED DESCRIPTION OF THE PREFERRED EMBODIMENTS

A substrate processing system comprising a substrate processing apparatus to which the invention is applicable will now be briefly described. In the following, a substrate may be any one of various types of substrates such as a semiconductor substrate, a glass substrate for photo mask, a glass substrate for liquid crystal display, a glass substrate for plasma display, a substrate for FED (Field Emission Display), an optical disk substrate, a magnetic disk substrate and a magneto-optic disk substrate. While the following will describe as an example a substrate processing system used primarily for processing of a semiconductor substrate with reference to drawings, the invention is applicable to processing of various types of substrates mentioned above.

Figure 1:
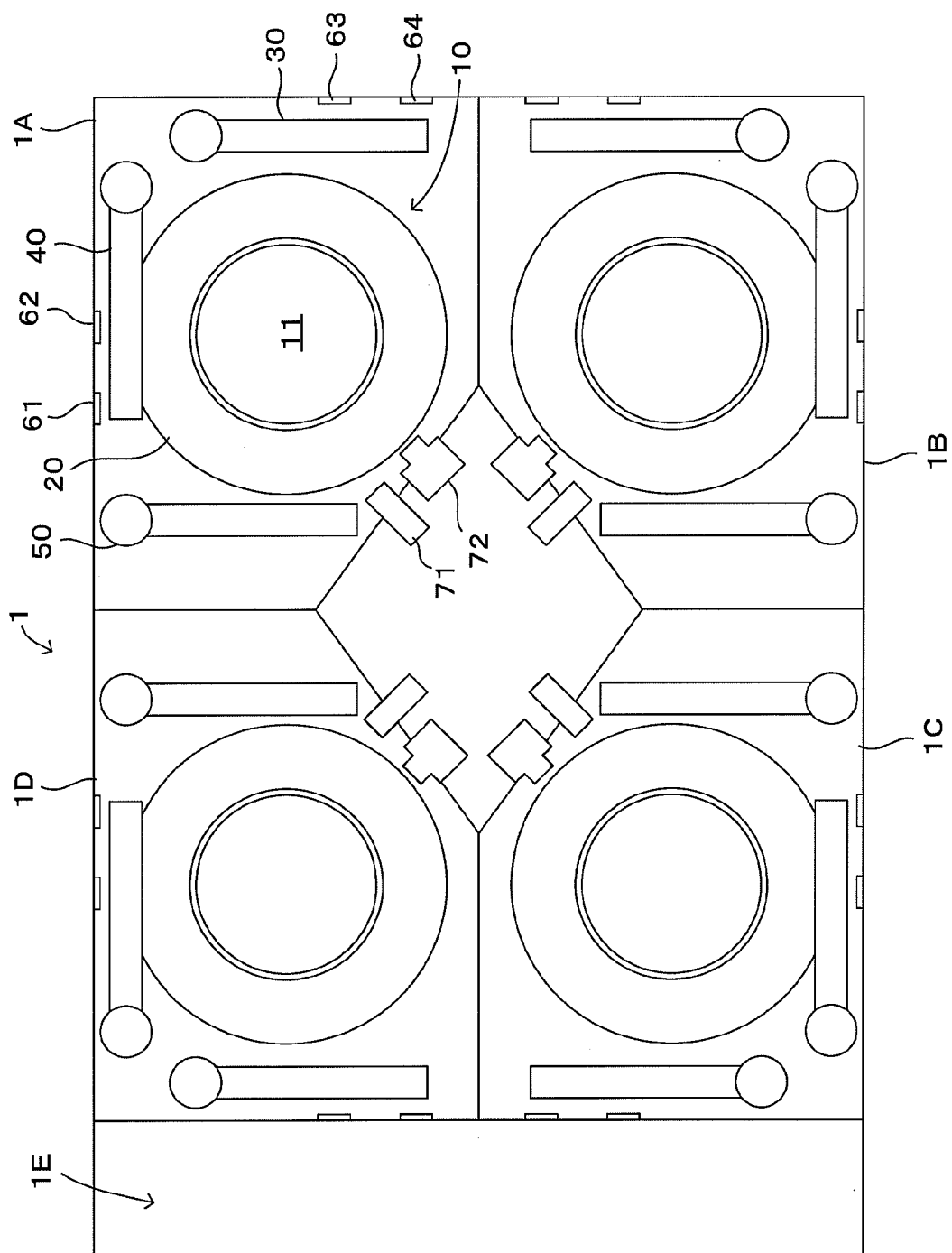
FIG. 1 is a schematic drawing which shows the structure of a substrate processing system according to an embodiment of the invention.
Figure 3:
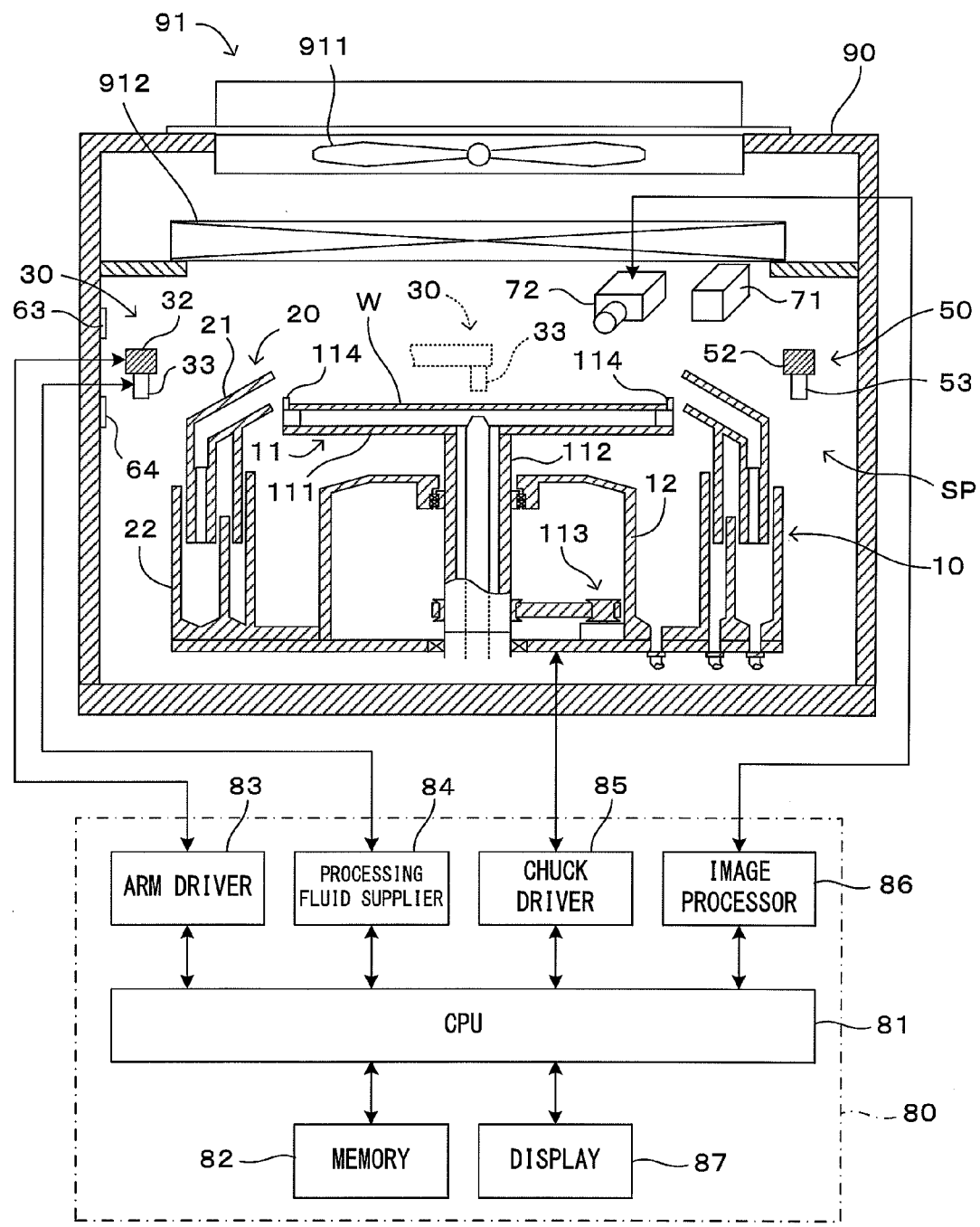
FIG. 3 is a drawing which shows the cross section of FIG. 2 taken along the arrow A-A and shows the structure of a controller of the substrate processing unit.

FIG. 1 is a schematic drawing which shows the structure of a substrate processing system according to an embodiment of the invention. To be more specific, FIG. 1 is a plan view which shows an embodiment of a substrate processing system comprising a substrate processing apparatus to which the invention is applied in a preferable fashion. The substrate processing system 1 comprises substrate processing units 1A, 1B, 1C and 1D, an indexer part 1E and a controller 80 (FIG. 3). The substrate processing units 1A, 1B, 1C and 1D are capable of executing predetermined processing of a substrate independently of each other. The indexer part 1E is equipped with an indexer robot (not shown) which is for transferring the substrate from the substrate processing units 1A, 1B, 1C and 1D to outside and vice versa. The controller 80 controls operations of the entire system. Any number of substrate processing units may be disposed, and more than one layers each housing four substrate processing units which are arranged horizontally may be stacked one atop the other.

The substrate processing units 1A, 1B, 1C and 1D are identical to each other with respect to structural elements and operations, although the layout of the structural elements is partially different depending upon the locations of these units within the substrate processing system 1. The following will describe the structure and operations of the substrate processing unit 1A but will omit describing the other semiconductor processing units 1B, 1C and 1D in detail.

FIG. 2 is a plan view which shows the structure of one substrate processing unit. FIG. 3 is a drawing which shows the cross section of FIG. 2 taken along the arrow A-A and shows the structure of the controller of the substrate processing unit. The substrate processing unit 1A is a wet processing unit of the single wafer processing type for executing wet processing, such as cleaning and etching using a processing fluid, of a disk-shaped substrate W such as a semiconductor wafer. In the substrate processing unit 1A, a fan filter unit (FFU) 91 is disposed to a ceiling section of a chamber 90. The fan filter unit 91 comprises a fan 911 and a filter 912. External atmosphere which is admitted as the fan 911 operates is supplied into a processing space SP which is inside the chamber 90 via the filter 912. The substrate processing system 1 is used as it is installed inside a clean room, and the processing space SP continuously receives clean air all times.

A substrate holder 10 is disposed inside the processing space SP of the chamber 90. The substrate holder 10 is for rotating the substrate W while maintaining the substrate W in an approximate horizontal posture so that the one surface of the substrate W is directed toward above. The substrate holder 10 comprises a spin chuck 11 in which a disk-shaped spin base 111 whose outer diameter is slightly larger than the substrate W and a rotation support shaft 112 which elongates approximately along the vertical direction are integrated and linked with each other. The rotation support shaft 112 is linked with the rotation shaft of a chuck rotating mechanism 113 which includes a motor so that it is possible for the spin chuck 11 to rotate about the rotation shaft (the vertical axis) when driven by a chuck driver 85 of the controller 80. The rotation support shaft 112 and the chuck rotating mechanism 113 are housed inside a cylindrical casing 12. The spin base 111 is integrated and linked with the top end of the rotation support shaft 112 by a fastening component such as a screw, and the spin base 111 is supported by the rotation support shaft 112 approximately horizontally. Hence, as the chuck rotating mechanism 113 operates, the spin base 111 rotates about the vertical axis. The controller 80 controls the chuck rotating mechanism 113 via a chuck driver 85, which makes it possible to adjust the rotation speed of the spin base 111.

There are a plurality of chuck pins 114 for grabbing the substrate W at the peripheral edge which are disposed in the vicinity of the peripheral edge of the spin base 111. There may be three or more (six in this example) such chuck pins 114 for the purpose of securely holding the circular substrate W. The chuck pins are disposed at equal angular intervals along the peripheral edge of the spin base 111. Each chuck pin 114 is structured so as to be able to switch between the pressing state in which it presses the exterior peripheral edge surface of the substrate W and the released state in which it is off the exterior peripheral edge surface of the substrate W.

Each one of the chuck pins 114 is released when the substrate W is handed over to the spin base 111 but remains in the pressing state when the substrate W is rotated and subjected to predetermined processing. When in the pressing state, the chuck pins 114 can hold the substrate W at the peripheral edge of the substrate and keep the substrate W approximately horizontally over a predetermined gap from the spin base 111. Thus, the substrate W is supported with its top surface directed toward above and its bottom surface directed toward below. The chuck pins 114 may be of a known structure such as that disclosed in JP2013-206983A for instance. The mechanism for holding substrates is not limited to chuck pins but may instead be a vacuum chuck which sucks the substrate W at the back surface of the substrate and thereby holds the substrate.

Around the casing 12, a splash guard 20 is disposed which surrounds the substrate W which is held horizontally by the spin chuck 11 in such a manner that the splash guard 20 can move upward and downward along the rotation shaft of the spin chuck 11. The splash guard 20 has an approximately rotation symmetric shape with respect to the rotation shaft, and comprises a plurality of guards 21 (two guards in this example), which are each disposed concentric to the spin chuck 11 and receive a splashed processing fluid from the substrate W, and a fluid receiver 22 which receives the processing fluid flowing down from the guards 21. As a guard up-down mechanism not shown disposed to the controller 80 makes the guards 21 ascend or descend stepwise, it is possible to segregate and collect a processing fluid such as a chemical solution and a rinse solution splashed around from the rotating substrate W.

Around the splash guard 20, at least one fluid supplier is disposed which provides the substrate W with various types of processing fluids such as a chemical solution which may be an etching solution, a rinse solution, a solvent, pure water and DIW (deionized water). In this example, as shown in FIG. 2, there are three fluid dischargers 30, 40 and 50. The fluid discharger 30 comprises a revolving shaft 31, which can revolve about the vertical axis when driven by an arm driver 83 of the controller 80, an arm 32 extending horizontally from the revolving shaft 31, and a nozzle 33 which is attached as it is directed toward below to the tip end of the arm 32. As the arm driver 83 drives the revolving shaft 31, the arm 32 swings about the vertical axis, whereby the nozzle 33 reciprocally moves between a retracted position which is outward beyond the splash guard 20 (i.e., the position denoted by the solid line in FIG. 3) and a position above the center of rotation of the substrate W (i.e., the position denoted by the dotted line in FIG. 3) as shown by the two-dot chain line in FIG. 2. The nozzle 33, while staying above the substrate W, discharges a predetermined processing fluid supplied from a processing fluid supplier 84 of the controller 80 and accordingly supplies the processing fluid to the substrate W.

Similarly, the processing fluid discharger 40 comprises a revolving shaft 41 which is driven by the arm driver 83, an arm 42 linked with this revolving shaft 41, and a nozzle 43 which is attached to the tip end of the arm 42 and discharges the processing fluid fed from the processing fluid supplier 84. The processing fluid discharger 50 comprises a revolving shaft 51 which is driven by the arm driver 83, an arm 52 linked with this revolving shaft 51, and a nozzle 53 which is attached to the tip end of the arm 52 and discharges the processing fluid fed from the processing fluid supplier 84. The number of the processing fluid dischargers is not limited to this but may be increased or decreased as needed.

In a condition that the substrate W is rotating at a predetermined rotation speed as the spin chuck 11 rotates, the processing fluid dischargers 30, 40 and 50 supply the processing fluid to the substrate W while the nozzles 33, 43 and 53 become positioned above the substrate W one after another, thereby performing wet processing of the substrate W. Different processing fluids or the same processing fluid may be discharged at the nozzles 33, 43 and 53 in accordance with the purpose of processing. Alternatively, two or more types of processing fluids may be discharged from one nozzle. The processing fluid supplied to the vicinity of the center of rotation of the substrate W spreads outwardly due to centrifugal force which develops as the substrate W rotates, and eventually gets drained off toward the side from the peripheral edge of the substrate W. The processing fluid thus splashed by the substrate W is then received by the guards 21 of the splash guard 20 and collected by the fluid receiver 22.

The substrate processing apparatus 1A further comprises an illuminator 71 which illuminates inside the processing space SP and a camera 72 which is neighboring of the illuminator 71 and takes an image of the surface of inside the processing space SP. The illuminator 71 uses an LED lamp as a light source for instance, and provides illumination light into inside the interior of the processing space SP which is needed for taking an image with the camera 72. The camera 72 is disposed at a higher position as compared with the substrate W along the vertical direction, and its imaging direction (i.e., the direction of the optical axis of the imaging optical system) is set as a downwardly oblique direction toward the approximate center of rotation in the surface of the substrate W so as to take an image of the top surface of the substrate W. The entire surface of the substrate W held by the spin chuck 11 thus comes into inside the field of view of the camera 72. In horizontally, an area between the two dashed lines in FIG. 2 is included in the field of view of the camera 72.

The illuminator 71 and the camera 72 may be disposed inside the chamber 90, or they may be disposed outside the chamber 90 so as to illuminate or take an image of the substrate W via a transparent window of the chamber 90.

Image data output from the camera 72 are fed to an image processor 86 of the controller 80. The image processor 86 then performs predetermined image processing of the image data such as a correction processing or a pattern matching processing described later. As described later in detail, in this embodiment, in accordance with images taken by the camera 72, how the nozzles 33, 43 and 53 are positioned and how the substrate W is held is determined. Further, the installment position of the camera 72 relative to the chamber 90 could get deviated from the appropriate position, which can be handled by the structure according to this embodiment.

For these purposes, alignment marks 61 through 64 which serve as position references are fixed at a plurality of positions which are within the field of view of the camera 72 and which are on an inner wall surface 901 of the chamber 90. The positions of the alignment marks 61 through 64 inside the chamber 90 have been determined in advance or are known as they were measured in advance. The alignment marks 61 through 64 are so arranged that as illumination light irradiated from the illuminator 71 is reflected at the surfaces of the alignment marks 61 through 64, the reflected light impinges upon the camera 72. The alignment marks 61 through 64 contained within an image shot by the camera 72 are used as position references which are for assessment of the positions, the postures and the like of the camera 72, the respective nozzles 33, 43 and 53 and the substrate W.

In addition to the above, the controller 80 of the substrate processing system 1 comprises a CPU 81, a memory 82 and a display 87. The CPU 81 executes a processing program set in advance and accordingly controls operations of the respective parts. The memory 82 stores the processing program executed by the CPU 81, data created during processing, etc. The display 87 informs a user as needed of a progress in processing, abnormality, etc. Each one of the substrate processing units 1A through 1D may have one such controller 80, or only one controller 80 may be disposed for the substrate processing system 1 for control of all substrate processing units 1A through 1D. Further, the CPU 81 may function as an image processor as well.

The operation of the substrate processing unit 1A having the structure above will now be described. The other substrate processing units 1B through 1D operate similarly although they will not be described. Through the indexer part 1E, the substrate processing unit 1A receives the substrate W which has been transported from outside and supplies various types of processing fluids while rotating the substrate W, thereby executing wet processing. A number of known techniques are available which use various types of processing fluids for wet processing, and any such technique may be used.

Figure 4:
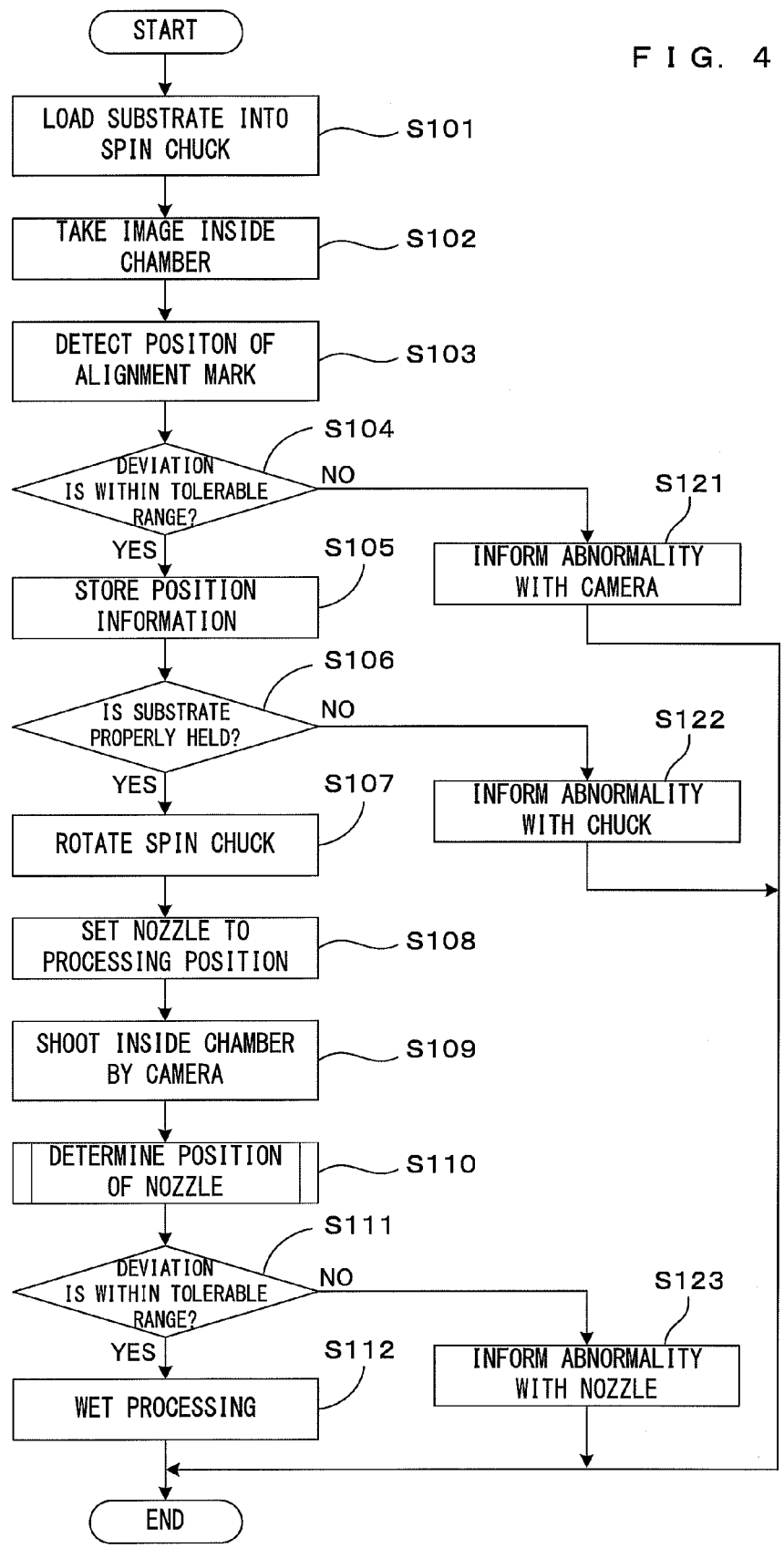
FIG. 4 is a flow chart which shows the operation of the substrate processing unit.

FIG. 4 is a flow chart which shows the operation of the substrate processing unit. This operation is realized as the CPU 81 executes the predetermined processing program. The substrate W is loaded into the substrate processing unit 1A and is then set to the spin chuck 11, more specifically, to the plurality of chuck pins 114 which are disposed to the peripheral edge of the spin base 111 (Step S101). During loading of the substrate W, the chuck pins 114 disposed to the spin base 111 are in the released state but switch to the pressing state after the substrate W is set at the chuck pins 114 and accordingly hold the substrate W. In this state, the camera 72 takes an image of inside of the chamber 90 (Step S102).

Figure 5:
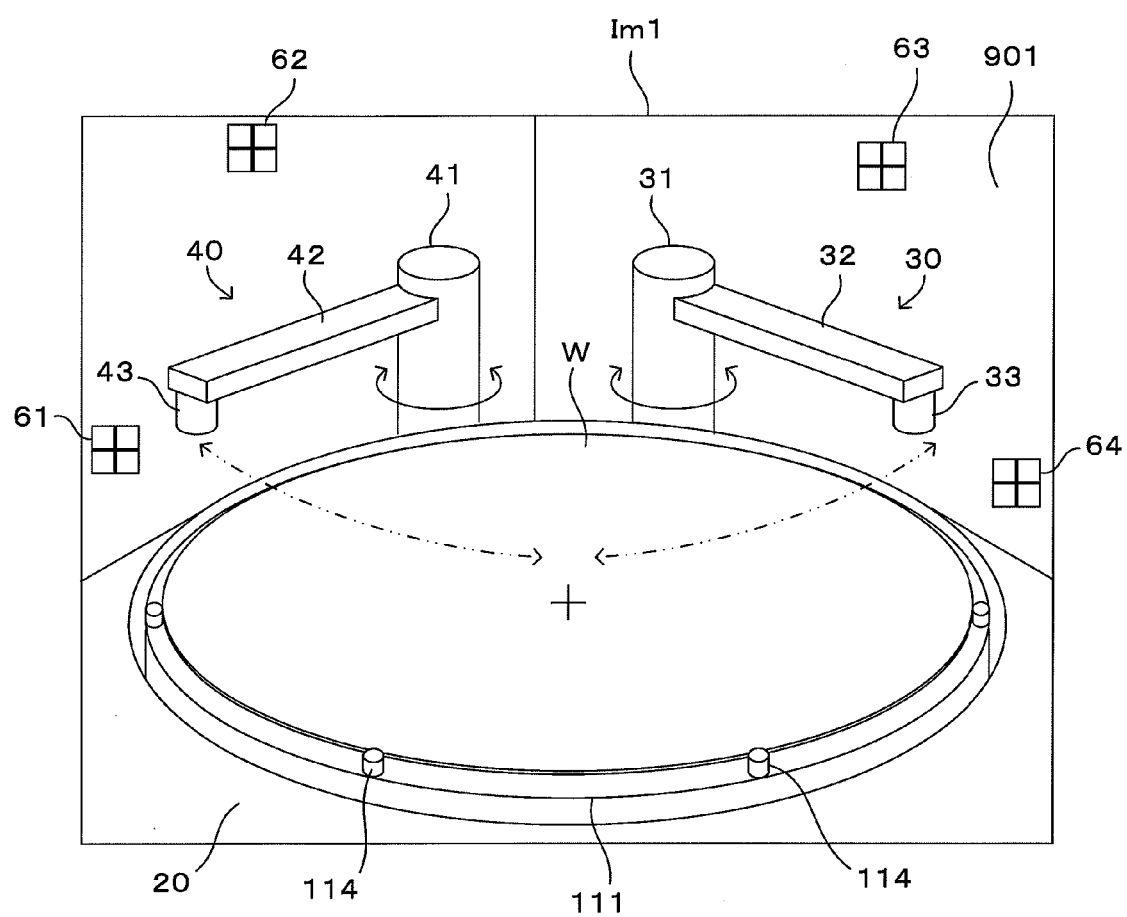
FIG. 5 is a schematic drawing which shows an example of an image which is obtained by imaging inside a chamber.

FIG. 5 is a schematic drawing which shows an example of an image which is obtained by imaging inside the chamber. An image Im1 shot by the camera 72 which is installed at such a position which looks down on the substrate W contains the substrate W which is mounted on the spin base 111 and the respective members such as the splash guard 20 which surrounds the substrate W, fluid dischargers 30 and 40 and the alignment marks 61 through 64. The assumption is that the camera 72 is attached at an appropriate position relative to the chamber 90.

The alignment marks 61 through 64 are arranged at dispersed positions on the chamber inner wall 901 which are within the field of view of the camera 72 and which are not blocked by the substrate W or the respective members disposed inside the chamber 90 such as the fluid dischargers 30 and 40. Specifically, the alignment marks 61 and 64 are so arranged that they are captured by the camera at such positions which are around the center of the image Im1 along the perpendicular direction and which are close to the far-left and the far-right along the horizontal direction. Meanwhile, the alignment marks 62 and 63 are arranged such that they are apart from each other horizontally close to the top edge of the image Im1. As the alignment marks 61 through 64 are dispersed in this manner, it is possible to enhance the accuracy during detection of deviation of the camera 72 which will be described later.

Although the alignment marks 61 through 64 may be of any desired material and may have any desired shapes, it is desirable that the camera 72 can shoot them under illumination light from the illuminator 71 in sufficient contrast for position detection. More preferably, it is desirable that the shapes of the alignment marks can be detected at a high accuracy from an image which was shot. The alignment marks 61 through 64 in this substrate processing unit 1A are rectangle plate members which bear the mark which looks like "+" as shown in FIG. 5. For instance, plate members of stainless steel on which the mark above is engraved or painted may be used. Provision of the alignment marks which have these characteristics makes it possible to highly accurately detect not only the positions of the alignment marks but rotation, the sizes and the like within the image as well.

In the event that the direction in which the illumination light impinges and the direction of the optical axis of the camera 72 generally match with each other as in the case of the unit 1A in which the camera 72 and the illuminator 71 are disposed in the vicinity of each other, it is preferable that at least one of the plate members and the marks is formed by a retroreflective material. This secures that the reflected light from the alignment marks impinges upon the camera 72 without fail, thereby making it possible to shoot high-contrast images of the alignment marks using large light quantity. In consequence, the accuracy for detecting the positions of the alignment marks is further increased.

As indicated by the double chain line in FIG. 5, the nozzles 33 and 43 which discharge the processing fluid are capable of moving horizontally. As the processing fluid is discharged in a condition that these nozzles are located at predetermined positions above the substrate W, the substrate W is processed. The nozzle 53 (FIG. 2) not shown in FIG. 5 as well, when moving toward above the substrate W, comes into the field of view of the camera 72. Using an image shot with the camera 72, it is possible to determine whether the positions of the nozzles during execution of the processing are appropriate. In this manner, it is possible to avoid inappropriate processing by any nozzle which is at an inappropriate position and to stably process the substrate W.

However, it is possible that the camera 72 per se could be deviated relative to the chamber 90 because of contact with any member during loading or unloading of the substrate W, vibration during the processing or the like for instance. It is therefore necessary to prevent misdetection of the position of any nozzle due to such deviation.

Figure 6:
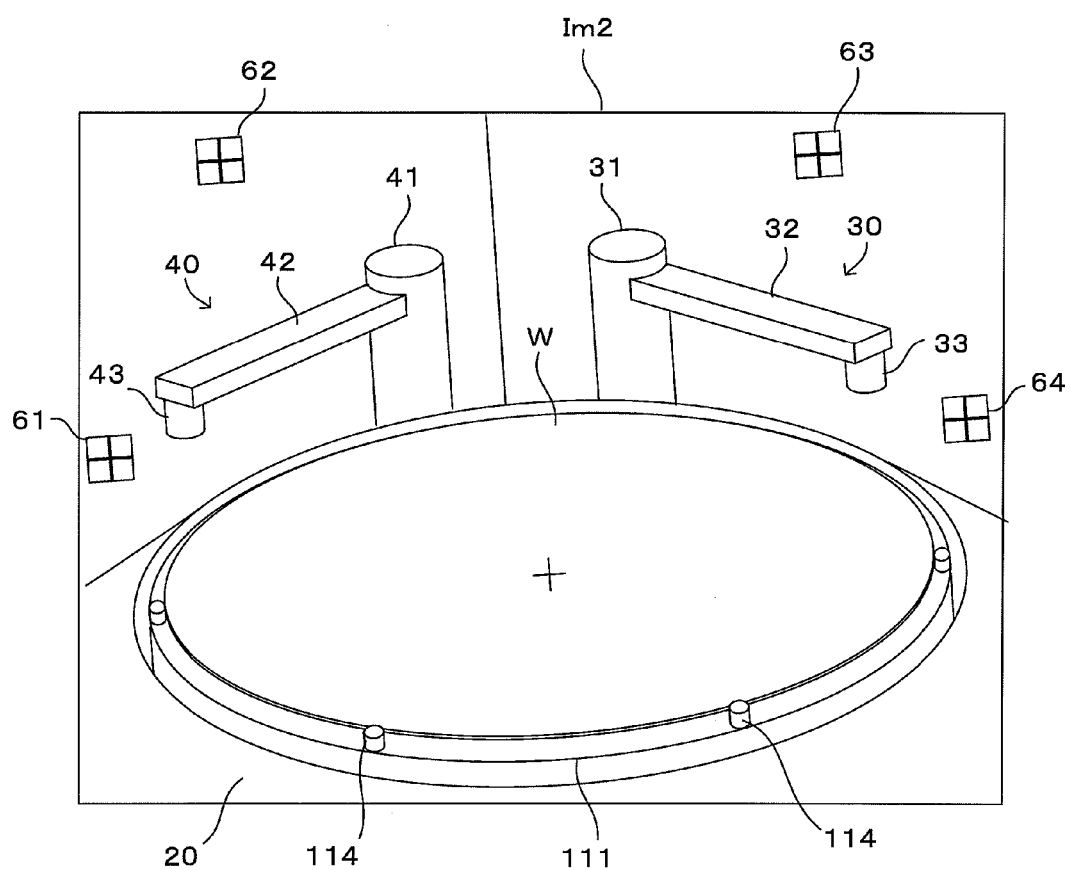
FIG. 6 is a schematic drawing which shows an example of an image which is shot by a camera which contains deviation.

FIG. 6 is a schematic drawing which shows an example of an image which is shot by a camera which contains deviation. If the camera 72 has deviated, in a shot image Im2 as well, the positions, the postures and the like of the respective members become different from those within the image Im1 shot with the camera 72 which is at the appropriate position shown in FIG. 5. The positions of the nozzles 33 and 43 and the like detected within the image Im2 contain deviation of the camera 72 and do not necessarily represent the positions of the nozzles 33 and 43 and the like within the processing space SP.

Meanwhile, the alignment marks 61 through 64 are fixed to the chamber 90 and the positions of the alignment marks do not change inside the processing space SP. Hence, if the positions of the alignment marks within the image Im2 have deviation from their positions within the image Im1, it is attributable to deviation of the camera 72. In other words, as the positions of the alignment marks within the image Im2 are detected and the amounts of deviation from the positions within the ideal image Im1 are calculated, the amount of deviation of the camera 72 can be estimated. Further, exclusion of the influence of deviation of the camera 72 from the image Im2 makes it possible to detect the positions of the nozzles 33 and 43 and the like inside the processing space SP.

Figures 7A, 7B:
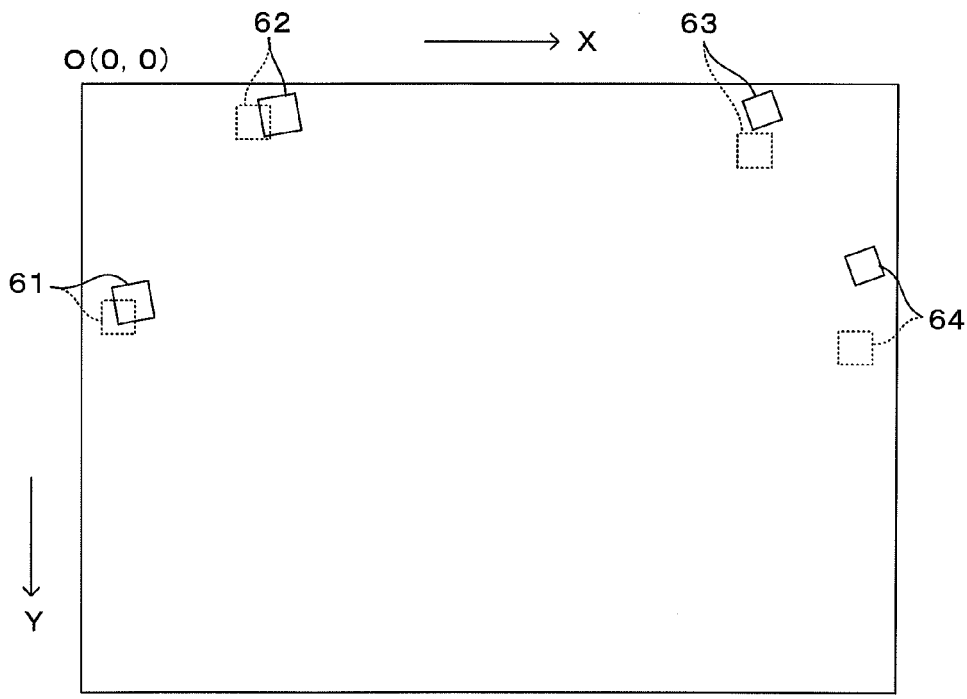
FIGS. 7A and 7B are schematic drawings which show deviation of alignment marks attributable to deviation of a camera.

FIGS. 7A and 7B are schematic drawings which show deviation of the alignment marks attributable to deviation of the camera. In FIG. 7A, for clarity of illustration, the objects within the image other than the alignment marks 61 through 64 are omitted. The positions of the alignment marks 61 through 64 denoted at the dotted lines in FIG. 7A are indicative of their positions within the image Im1 shot with the camera 72 located at the appropriate position. Meanwhile, the positions of the alignment marks 61 through 64 denoted at the solid lines are indicative of their positions within the image Im2 shot with the camera 72 deviated from the appropriate position.

The respective alignment marks 61 through 64 are dispersed along the perpendicular direction, the horizontal direction and the depth direction inside the processing space SP. Therefore, the deviations of the alignment marks are different from each other depending upon how the camera 72 is deviated. Specifically, displacement of the camera 72 along the direction of the optical axis changes the X-coordinates and the Y-coordinates of the positions of the alignment marks. Inclination of the camera 72 manifests itself as rotation of the alignment marks within the image Im2. Further, deviation of the camera 72 along the direction toward the substrate W or the like makes the respective objects within the image such as the alignment marks large, but as the camera 72 moves away, the objects become small. That is, the image may show changes and rotation of the coordinate positions of the alignment marks and changes of the sizes of the alignment marks due to expansion or shrinkage.

Noting this, the amounts of deviation of the respective alignment marks are evaluated while considering a coordinate plane whose origin O is the top left corner of the image, whose top side is the X-axis and whose left side is the Y-axis and while using as indicators the coordinates (the X-coordinates and the Y-coordinates) of the position of the center of gravity of each alignment mark within the coordinate plane, the angle of rotation of each alignment mark and a scale which measures the extent of enlargement or shrinkage of the image. For detection of the positions of the alignment marks 61 through 64, using a known pattern matching technique, a pattern which matches with a pattern corresponding to the images of the alignment marks cut out from the image Im1 for instance may be found within the image Im2 and the coordinates expressing the position of thus detected pattern may be identified.

FIG. 7B shows an example of the numerical values which the respective indicators take. The alignment marks 61, 62, 63 and 64 are indicated as "MARK 1," "MARK 2," "MARK 3" and "MARK 4," respectively. The X-coordinates and the Y-coordinates express, as the number of pixels, where the center of gravity of each alignment mark is located in an image whose size is 640 pixels times 480 pixels. Within the ideal image Im1, the angle of rotation of each one of the alignment marks 61 through 64 is zero, and the X-direction size and the Y-direction size of each one of the alignment marks 61 through 64 within this image is expressed on the scale of 100. If any alignment mark becomes larger than the ideal image Im1, the scale value is greater than 100, whereas if this alignment mark becomes smaller than the ideal image Im1, the scale value is less than 100. The exemplary numerical values in FIG. 7B are merely for description and are not any numerical values in any actual image.

"REFERENCE VALUE" ("REF. VALUE" in FIG. 7B) is a value which corresponds to each alignment mark within the ideal image Im1 in a condition that the camera 72 is located at the appropriate position. These reference values may be acquired from an image which was shot in advance with the camera 72 located at the appropriate position, or may be ideal values which are calculated based upon the designed relationship among the respective members. Meanwhile, "ACTUAL MEASUREMENT VALUE" ("ACTUAL VALUE" in FIG. 7B) is a value which corresponds to each alignment mark within the actual image Im2 which could potentially contain deviation of the camera 72. "DIFFERENCE" is a value which is obtained by subtracting a reference value from an actual measurement value.

When the camera 72 has deviation, there are discrepancies between the actual measurement values and the reference values which the values concerning the respective alignment marks take as shown in FIG. 7B. The amount of deviation of the camera 72 can be estimated from these numerical values. This is specifically done for example as described below.

The amount of deviation of the imaging direction of the camera 72 can be expressed by average values of the differences between the reference values and the actual measurement values of the coordinates of the respective alignment marks for example. It is possible to express deviation along the horizontal direction of the camera 72 by average values of the differences along the X-direction of the image, and deviation along the vertical direction by average values of the differences along the Y-direction of the image.

Inclination of the camera 72 can be expressed by average values of the differences between the reference values and the actual measurement values of the angles of rotation of the respective alignment marks for instance. Since the structure of this apparatus 1 allows detection of the angles of rotation of the alignment marks 61 through 64 independently of each other, it is possible to calculate inclination of the camera 72 by the method above. When it is difficult to detect the angles of rotation of the alignment marks independently of each other, the method for calculating inclination of the camera 72 may be as described below.

An imaginary line which connects the center of gravity of one alignment marks which are contained in an image with that of another alignment marks, and inclination of this line within the image is calculated from the coordinates which represents the positions of the two alignment marks. A difference between inclination calculated within the ideal image Im1 and inclination calculated within the actual image Im2 expresses inclination of the camera 72. By this method, once the position of the center of gravity of each alignment mark is calculated, inclination can be calculated. This method can therefore be applied even when the alignment marks within an image are unclear for instance.

The magnitude of expansion or shrinkage of an image which occurs as the camera 72 moves closer to or far away from the substrate W or the like can be expressed by average values of the differences between the reference values and the actual measurement values of the scale values of the respective alignment marks. It is possible to express the scale values along the horizontal direction of the camera 72 by average values of the differences along the X-direction of the image, and the scale values along the vertical direction by average values of the differences along the Y-direction of the image.

It may not be appropriate to evaluate the scale values of any alignment mark because of the shape, an unclear image or the like of that alignment mark. In that case, it is possible to express the horizontal-direction and the vertical-direction scale values respectively by the X-direction distances and the Y-direction distances among the center of gravity of the plurality of alignment marks for example.

The flow chart will be described continuously, with reference back to FIG. 4. Using the image inside the chamber 90 shot at Step S102, the positions of the alignment marks 61 through 64 within the image are detected in accordance with the principle described above (Step S103). The amount of deviation of the camera 72 is then evaluated based upon the detection result. When the amount of deviation is within a predetermined tolerable range (YES at Step S104), the processing at and subsequent to Step S105 is executed. On the other hand, when the amount of deviation is beyond the tolerable range (NO at Step S104), the display 87 displays a predetermined error message for instance, thereby informing a user of the abnormality with the camera (Step S121). This completes the processing.

The camera 72 could be significantly deviated due to some reason and any alignment mark could therefore exit the field of view of imaging. In such an instance, it is not possible to detect the position of this alignment mark, and this condition will obviously hinder later detection. Therefore, this can be treated as camera abnormality.

In this substrate processing unit 1A, after detection of deviation of the camera 72 in the manner described above, the processing continues upon the assumption that minor deviation will be corrected through image processing. On the other hand, the processing is discontinued when there is deviation which is too large to avoid deterioration of the detection accuracy even through correction. In this fashion, deviation of the camera 72 to a certain degree is tolerated and the processing is allowed to continue. While suspension of the entire processing owing to deviation of the camera 72 which does not directly contribute to processing of the substrate causes deterioration of the throughput of the processing and the utilization rate of the system, it is possible to reduce the probability of giving rise to such a situation. In contrast, the processing is discontinued when there is big deviation, it is possible to prevent inappropriate processing of the substrate.

When the calculated amount of deviation of the camera 72 is within the tolerable range, information which is indicative of the amount of deviation at that time is stored in a memory 82 (Step S105). This information is later used as correction information for detection of the positions of the nozzles. The information stored in the memory 82 may be position information with respect to each one of the alignment marks 61 through 64, or may be information representing the amount of deviation of the camera 72 calculated from such position information. There is no difference among these types of information in that each such information encompasses the position information regarding the alignment marks detected within the image Im2.

Following this, whether the substrate W is properly held by the spin chuck 11 is determined (Step S106). In the event that the substrate W is set on the spin base 111 in a condition that the substrate W is tilted with respect to the spin base 111 or eccentric with respect to the center of rotation of the spin base 111, a problem may arise that the substrate W is dropped off or vibrates in an abnormal manner when the spin chuck 11 rotates. To avoid this, how the substrate W is held is determined before the spin chuck 11 rotates. How the substrate W is held is determined based upon the posture of the substrate W which is detected from the image.

Figures 8A, 8B, 8C:
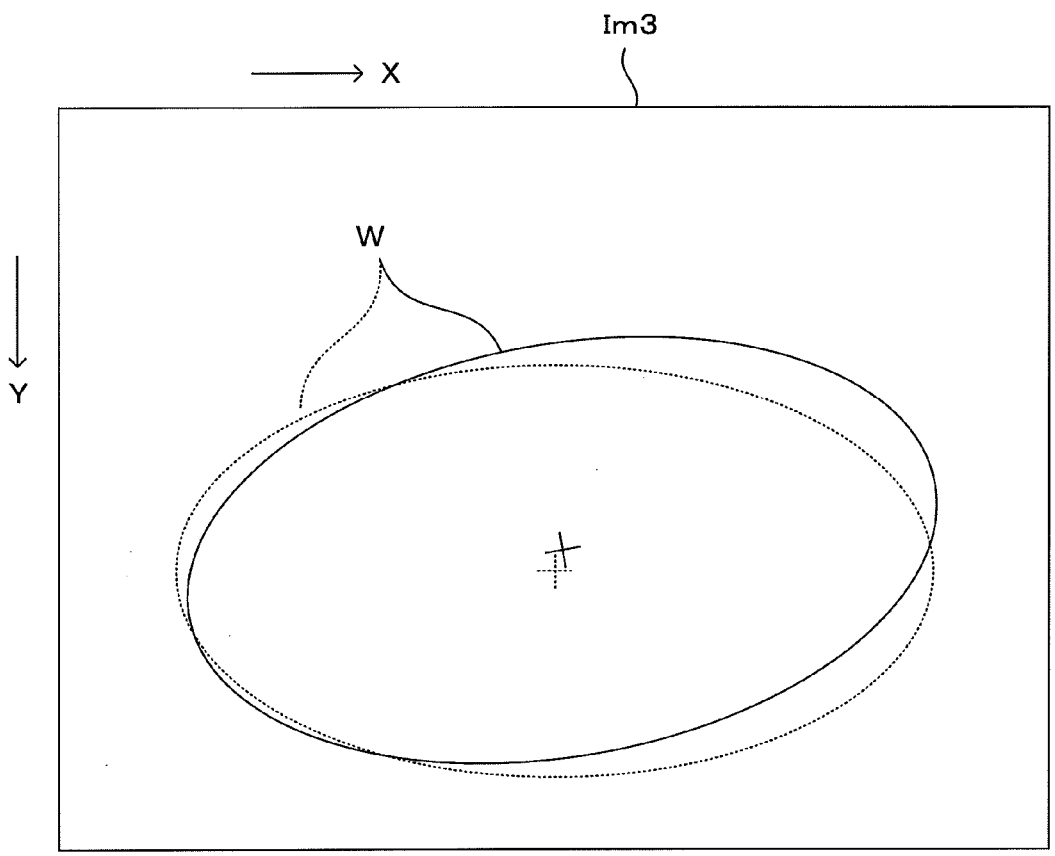
FIGS. 8A through 8C are drawings which show an example of a method of evaluating the posture of a substrate.

FIGS. 8A through 8C are drawings which show an example of a method of evaluating the posture of a substrate. FIG. 8A shows an example of an image Im3 which contains the substrate W shot by the camera 72. For clarity of illustration, FIG. 8A omits other objects than the substrate W. The area denoted at the dotted line represents the area which the substrate W occupies in the image when the substrate W is properly held by the spin chuck 11. Meanwhile, when the substrate W is improperly held, the substrate W is deviated or tilted within the image as denoted by the solid line. Whether the substrate W is properly held or not can be determined by evaluating the posture of the substrate W within the image which was shot with the substrate W held by the spin chuck 11, namely, the position of the center of the substrate W which looks like an oval within the image and the size of the substrate W.

A known pattern matching technique can be used for detection of the substrate W within the image. Besides, as a method which realizes detection within a relatively short period of time, a known ellipse detection algorithm can be used. As shown by the example in FIG. 8B, an appropriate ellipse detection algorithm searches for an ellipse whose size corresponds to the diameter of the substrate W within a search area which is the coordinate range of an area within the image Im3 which is highly likely occupied by the substrate W. In consequence, the center coordinates, the X-direction size and the Y-direction size of an ellipse which meets the conditions are obtained as shown by the example in FIG. 8C.

When thus obtained numerical values are approximately the same as the numerical values corresponding to an ideal state in which the substrate W is held, it can be determined that the substrate W is appropriately held. In contrast, when the numerical values are greatly different, it can be determined that the substrate W is inappropriately held.

The posture of the substrate W detected from the image is the sum of the posture of the substrate W within the processing space SP and the influence of deviation of the camera 72 described earlier. Hence, based upon the position information concerning the alignment marks obtained earlier, the influence of deviation of the camera 72 is subtracted from the posture of the substrate W obtained as a result of the search and the posture thus obtained is compared with the ideal state. From the result of this, how the substrate W is held is determined.

The flow chart will be described continuously, with reference back to FIG. 4. When it is determined that the substrate W is improperly held by the spin chuck 11 is determined (NO at Step S106), the user is informed of the abnormality with the chuck as the display 87 displays a predetermined error message for example (Step S122). This ends the processing. It is thus possible to obviate fall, abnormal vibration or the like of the substrate W which otherwise occurs when the spin chuck 11 rotates while the substrate W is inappropriately held.

When the substrate W is properly held (YES at Step S106), the chuck driver 85 rotates the spin chuck 11 at a predetermined rotation speed which is for substrate processing (Step S107). Following this, the arm driver 83 operates, whereby any one of the plurality of nozzles is set to a predetermined processing position which is opposed to the substrate W (Step S108). While the processing using the nozzle 43 will be described in the following, operations remain similar when the other nozzle 33 or 53 is used. Alternatively, the plurality of nozzles may be used in the processing at the same time. Once the nozzle 43 is set to the processing position, the camera 72 shoots inside the chamber 90 (Step S109), and the position of the nozzle 43 is determined based upon thus shot image (Step S110).

Figure 9:
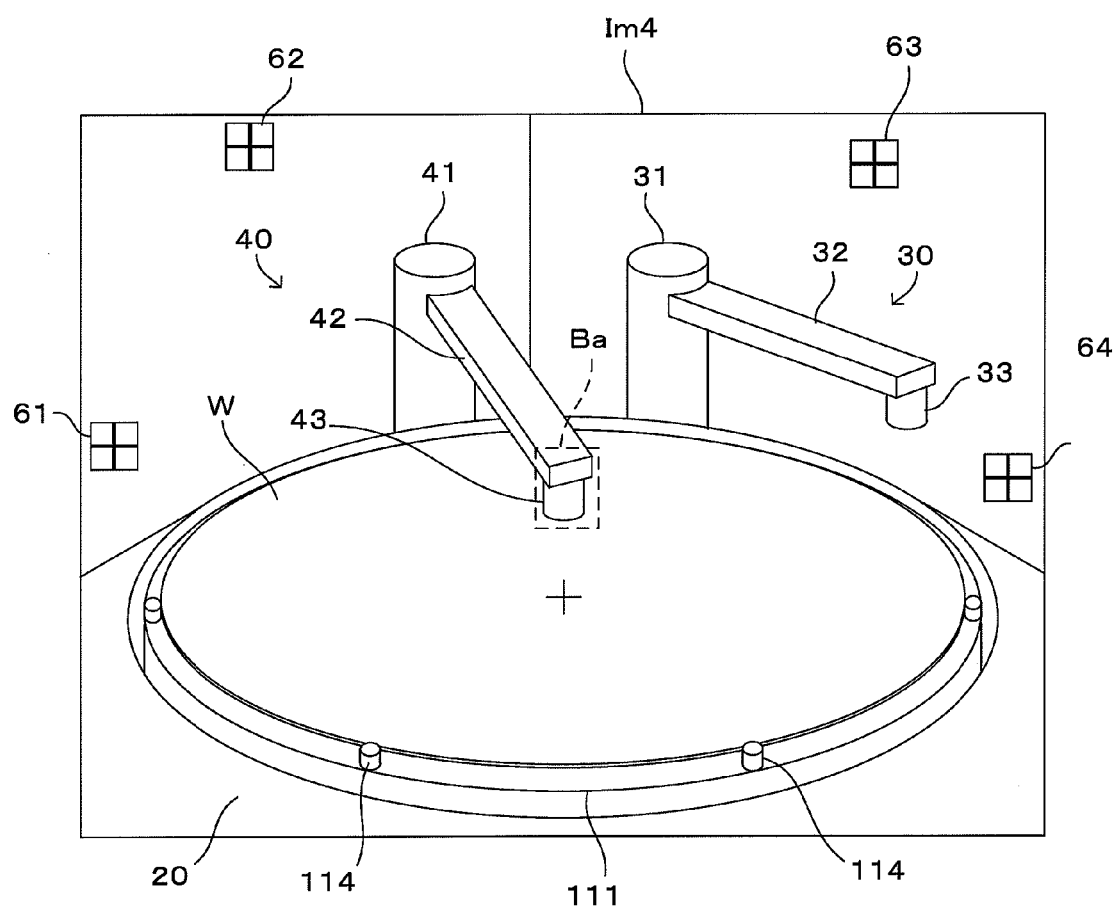
FIG. 9 is a drawing which shows an example of an image which is shot in a condition that a nozzle is set to a processing position.

FIG. 9 is a drawing which shows an example of an image which is shot in a condition that the nozzle is set to the processing position. Describing this in more detail, the example in FIG. 9 shows an image inside the chamber 90 shot by the camera 72 in an ideal condition that the camera 72 is attached to the appropriate position and the nozzle 43 is correctly set to the processing position. An image Im4 thus obtained is the same as the image Im1 shown in FIG. 5, except for the postures of the arm 42 and the nozzle 43 attached to the end of the arm 42. The processing position of the nozzle 43 can be taught to the controller 80 through teaching in advance.

In this condition, an image pattern of an area Ba which the nozzle 43 occupies within the image is stored in advance within the memory 82 as a reference matching pattern. Further, information regarding the coordinates of the area Ba is stored in advance within the memory 82 as box information which is used for detection of the position of the nozzle during execution of the processing of the substrate. For every execution of the processing of the substrate, the position of the nozzle 43 is detected from the image shot at Step S109 and compared with the box information, and whether the position of the nozzle 43 is appropriate is determined.

Figure 10A:
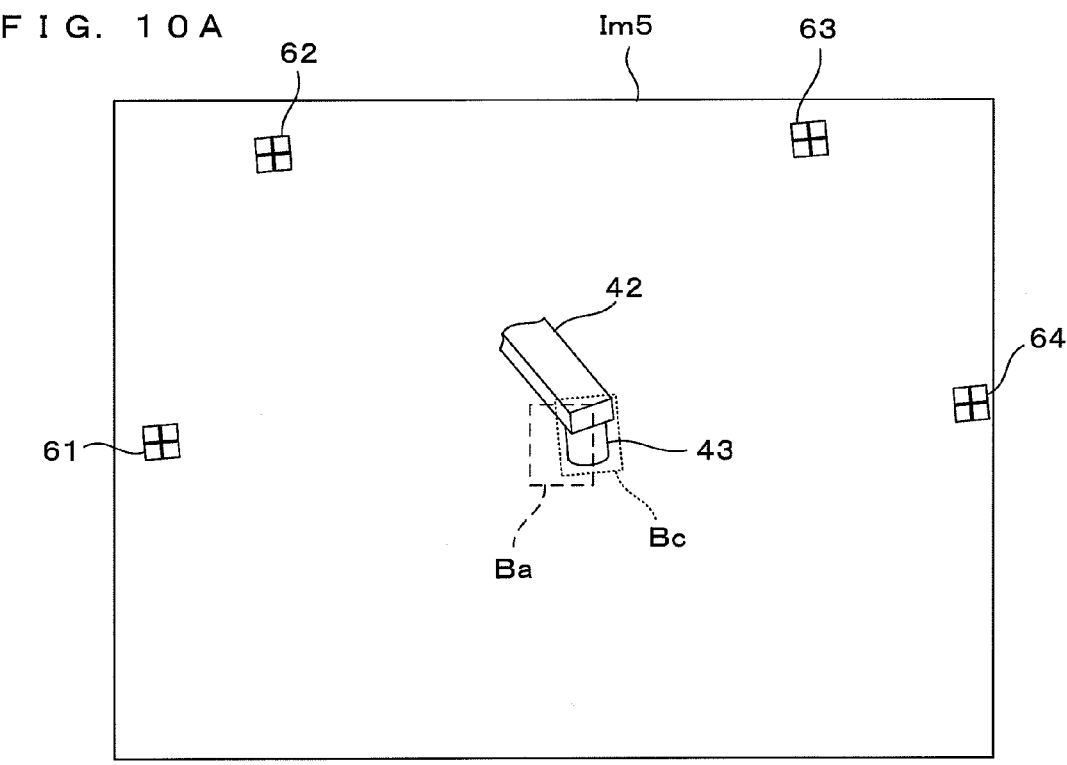
FIGS. 10A and 10B are drawings which show an example of an image of the nozzle.
Figure 10B:
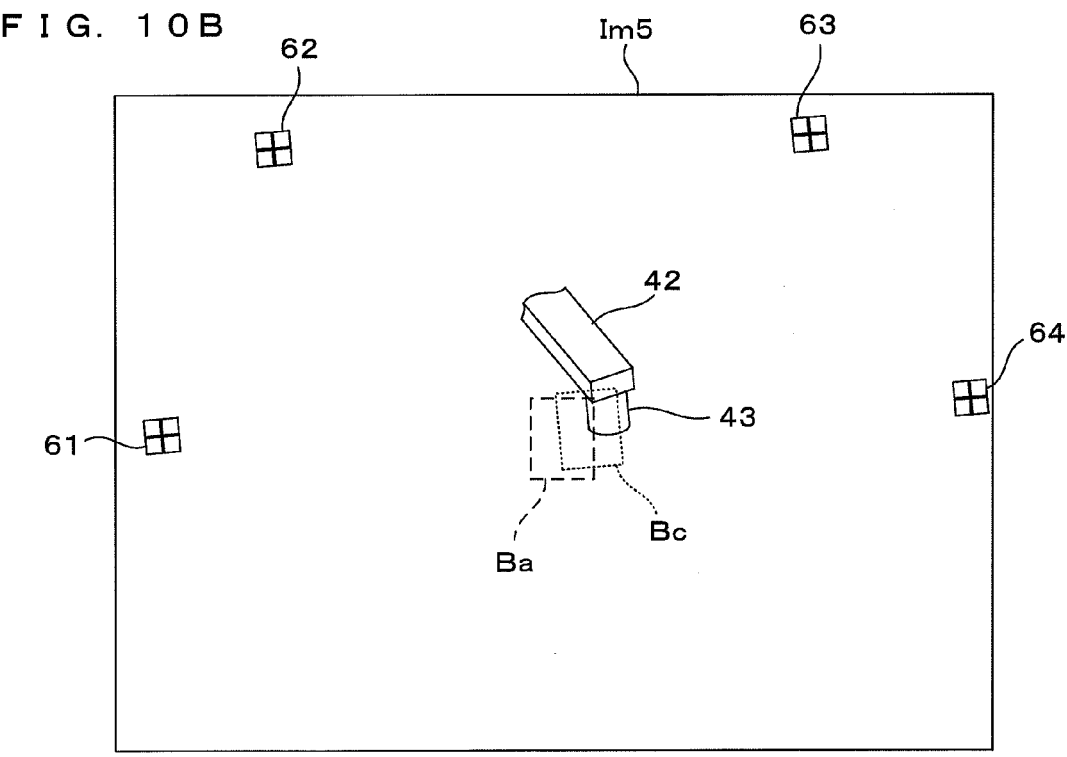

FIGS. 10A and 10B are drawings which show an example of an image of the nozzle. Specifically, FIGS. 10A and 10B show the example of the image shot by the camera 72 at Step S109. For clarity of illustration, the objects within the image other than the arm 42, the nozzle 43 and the alignment marks 61 through 64 are omitted. In an ideal condition without deviation, the nozzle 43 is contained in the area Ba which is designated by the box information stored in the memory 82. Hence, pattern matching between the image Im4 and the image Im5 must make it possible to achieve a high matching score between image patterns cut out from the area Ba. As the nozzle 43 is deviated more and more, a matching score becomes smaller. It is thus possible to determine whether the nozzle 43 is correctly set to the processing position by cutting out the image pattern of the area Ba designated by the box information as a matching model from the image Im5 shot at Step S109 and evaluating a matching score between thus cut image pattern and the reference matching pattern stored in the memory 82.

However, the image of the nozzle 43 contained in the actually shot image Im5 contains both actual deviation inside the processing space SP which can be caused by imperfect setting of the nozzle 43 and apparent deviation which is attributable to deviation of the camera 72. Therefore, mere comparison of the image pattern of the area Ba cut out from the image Im5 with the reference matching pattern will result in delivering a result containing deviation which is attributable to deviation of the camera 72 and will lead to erroneous judgement concerning the position of the nozzle 43 inside the processing space SP. Using the position information concerning the alignment marks stored in the memory 82 in advance, it is possible to judge the position of the nozzle while excluding the influence by deviation of the camera 72 as described below.

Figure 11:
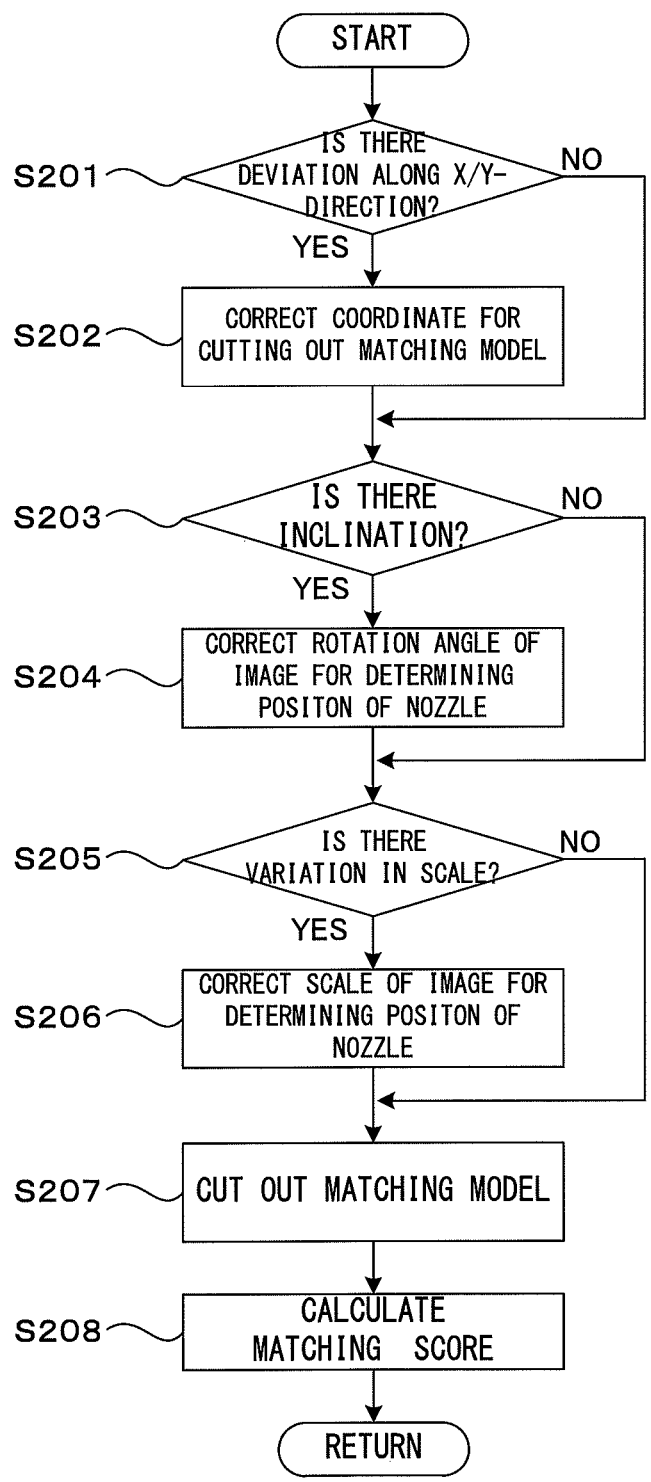
FIG. 11 is a flow chart which shows processing of judging the position of the nozzle.

FIG. 11 is a flow chart which shows processing of judging the position of the nozzle. This flow chart describes the content of the processing at Step S110 shown in FIG. 4 in more detail. In this processing, first, based upon the position information concerning the alignment marks stored in the memory 82, whether there is deviation of the camera 72 along the X-direction and the Y-direction is determined (Step S201). When there is deviation in any one of these directions, the coordinates for cutting out the matching model which is identified by the box information within the image Im5 which is for determining the position of the nozzle are corrected in accordance with the amounts of deviation in each direction (Step S202). This moves the position at which the matching model is cut out within the image Im5 parallel along the X-direction and/or the Y-direction within the plane of the image, thereby eliminating the influence exerted by deviation of the camera 72. In the absence of deviation, Step S202 is skipped.

Next, based upon the position information concerning the alignment marks stored in the memory 82, whether there is inclination of the camera 72 is determined (Step S203). When there is inclination, for the purpose of cancelling this, the image Im5 is rotated for an amount which corresponds to inclination of the camera, and the image for determining the position of the nozzle is corrected (Step S204). Instead of rotating the image, the area for cutting out the matching model may be inclined, as this is technically equivalent. This removes the influence exerted by inclination of the camera 72. In the absence of inclination, Step S204 is skipped.

Next, based upon the position information regarding the alignment marks stored in the memory 82, whether there is variation in the scale is determined (Step S205). When there is variation, the image for determining the position of the nozzle is expanded or shrunk in accordance with the scale values, and the image for determining the position of the nozzle is corrected (Step S206). Instead of expanding or shrinking the image, the range in which the matching model is cut out may be expanded or shrunk, as this is technically equivalent. In the absence of variation in the scale, Step S206 is skipped.

In this manner, based upon the position information regarding the alignment marks (or associated information concerning deviation of the camera 72), the position of the image for judging the nozzle (the image Im5) relative to the position of the area for cutting out the matching model from this image is corrected. In consequence, a new cut area Bc is set for which the coordinates, the angles of rotation and the scale are corrected as shown in FIG. 10A. The area Bc is indicative of the area which the nozzle 43, which is at the processing position inside the processing space SP, occupies within the image shot by the camera 72 containing deviation. Hence, a matching pattern cut out from the area Bc is free from the influence exerted by the deviation of the camera 72.

From the image for judging the position of the nozzle, a matching pattern is cut out from thus set new area Bc (Step S207). A matching score between this matching pattern and the reference matching pattern stored in the memory 82 is then calculated (Step S208). Since the image of the nozzle 43 appears within the post-correction cut area Bc when the nozzle 43 is correctly set to the processing position, a high matching score is obtained as shown in FIG. 10A.

Meanwhile, when there is deviation of the nozzle 43 from the processing position, as shown in FIG. 10B, the image of the nozzle 43 appears at a different position from the cut area Bc. The matching score is therefore low. The amount of deviation of the nozzle 43 from the processing position can thus be expressed by how high or low the matching score is between the reference matching pattern prepared in advance and the matching model cut out from the corrected cut area Bc inside the image for judging the position of the nozzle. The obtained result is free from the influence exerted by the deviation of the camera 72.

As an unfavorable example, deviation of the camera 72 and deviation of the nozzle 43 from the processing position could both occur and offset each other so that the image of the nozzle 43 appears in the area Ba within the image Im5 or near the same. In such an instance, when pattern matching is performed without correcting the cut area as that described above, a high matching score is obtained and it is wrongly determined that the position of the nozzle 43 is appropriate. This problem can be avoided by the method described above.

The flow chart will be described continuously, with reference back to FIG. 4. Whether thus obtained amount of deviation of the nozzle 43 from the processing position (namely, the value of the matching score) is within a tolerable range set in advance is determined (Step S111). When the amount of deviation is within the tolerable range (YES at Step S111), the predetermined processing fluid is supplied from the nozzle 43 to the substrate W and the wet processing is executed (Step S112). When the amount of deviation of the nozzle 43 is beyond the tolerable range (NO at Step S111), the display 87 shows a predetermined error message for instance, thereby informing the user of the abnormality with the nozzle (Step S123). This ends the processing. It is thus possible to prevent supply of the processing fluid from the nozzle 43 which is at an inappropriate position and hence a poor processing result. In addition, since it is assured that the nozzle 43 which is set to the appropriate position carries out the processing, it is possible to obtain a favorable processing result in a stable manner.

As described above, according to this embodiment, based upon the image shot by the camera 72, the position of the nozzle 43, which is so structured to be movable within the processing space SP inside the chamber 90 which is provided in the substrate processing unit 1A, is judged. At this stage, the position of the nozzle 43 as it is detected within the image is not treated as it is as the position of the nozzle 43: using the information concerning the positions of the alignment marks 61 through 64, which are fixed at the set positions inside the chamber 90, within the image, the position of the nozzle 43 within the processing space SP is detected. As the information concerning the positions, which are the known positions inside the chamber 90, of the alignment marks 61 through 64 is used together, it is possible to accurately detect the position of the nozzle within the processing space SP while excluding the influence of deviation of the camera 72.

In the embodiment above, the position of the nozzle 43 is detected using the corrected image which is obtained by correcting the nozzle position judgement image Im5 containing the nozzle 43 set to the predetermined position based upon the information regarding the positions of the alignment marks. In this fashion, the influence exerted by deviation of the camera 72 can be excluded even from an image shot by the deviated camera 72.

Further, in the embodiment above, the nozzle 43 is detected in the cut area Bc which is set according to the position information regarding the alignment marks. Since the nozzle 43 is detected only around an expected position of the nozzle 43 instead of searching for the nozzle 43 in the entire image, the processing time can be shortened. As the area for detection is set in accordance with the position information regarding the alignment marks, it is possible to detect the nozzle 43 in an even shorter period of time without fail.

Further, the position information regarding the alignment marks 61 through 64 may be information which is indicative of relative positions based upon the positions of the alignment marks within the ideal image in which the camera 72 is not deviated. This is because it is possible to calculate the amount of deviation of the camera 72 in accordance with comparison of the reference values with the actual measurement values in the ideal condition. Such reference values may be obtained in advance and stored in the memory 82.

Further, in the embodiment above, the position of the nozzle 43 in the image shot during the actual operation (FIG. 10A or 10B) is identified as the amount of deviation from the position of the nozzle 43 within the ideal image (FIG. 9) shot with the camera 72 and the nozzle 43 set respectively to the appropriate positions. When it is possible to estimate the position of the nozzle 43 to a certain extent, calculation of the relative position from the reference position, not calculation of the absolute position of the nozzle 43 within the processing space SP, realizes more efficient detection of the position.

Further, in the embodiment above, the illuminator 71 for irradiating inside the chamber 90 is disposed and the alignment marks 61 through 64 are so arranged that illumination light from the illuminator 71 is reflected by the alignment marks 61 through 64 and impinges upon the camera 72. This realizes imaging of the alignment marks 61 through 64 with more light and improves the accuracy of detecting the positions of the alignment marks. Particularly when the alignment marks are at least partially made of a recursive reflective material, owing to irradiation from the approximately same direction as the imaging direction, clear images of the alignment marks can be obtained. Therefore, the illuminator 71 and the camera 72 may be formed as one integrated structure.

As the position information regarding the alignment marks the coordinates, inclination and the scale values which express changes of the sizes are used. These pieces of information are indicators of deviation and inclination along the imaging direction of the camera 72 and shifting of the distances from the respective members inside the chamber 90, respectively. Using these as the position information, it is possible to precisely grasp deviation of the camera 72 relative to the chamber 90.

Further, the processing by the substrate processing unit 1A according to the embodiment above is discontinued when the detected amount of deviation of any alignment mark is beyond the predetermined tolerable range. As described earlier, the processing by the substrate processing unit 1A according to the embodiment above is capable of continuing the processing while removing the influence of a certain degree exerted by deviation of the camera 72. However, as deviation grows, a detection error may intensify and it may therefore become impossible to completely eliminate the influence upon the later processing. Noting this, the processing is discontinued in response to deviation which is beyond the tolerable amount, which obviates execution of inappropriate processing.

As described above, the camera 72 which does not directly contribute to the processing of the substrate, unless hindering detection of the position of the nozzle 43, may have deviation to a certain extent. Meanwhile, the processing may fail unless the position of the nozzle 43, which supplies the processing fluid directly to the substrate W, is appropriate. The processing is therefore discontinued when the detected amount of deviation of the nozzle 43 is beyond the appropriate range, thereby avoiding such processing failure.

For the purpose of judging whether the position of the nozzle is appropriate, according to the embodiment above, the amounts of deviation from the reference position in the ideal condition are expressed by the magnitude of the matching score and the relative position of the nozzle 43 from the reference position is identified, instead of directly detecting the position of the nozzle 43 within the processing space SP. For detection of the absolute position of the nozzle 43 within the processing space SP, processing as that described below may be performed instead of the processing shown in FIG. 11.

Figure 12:
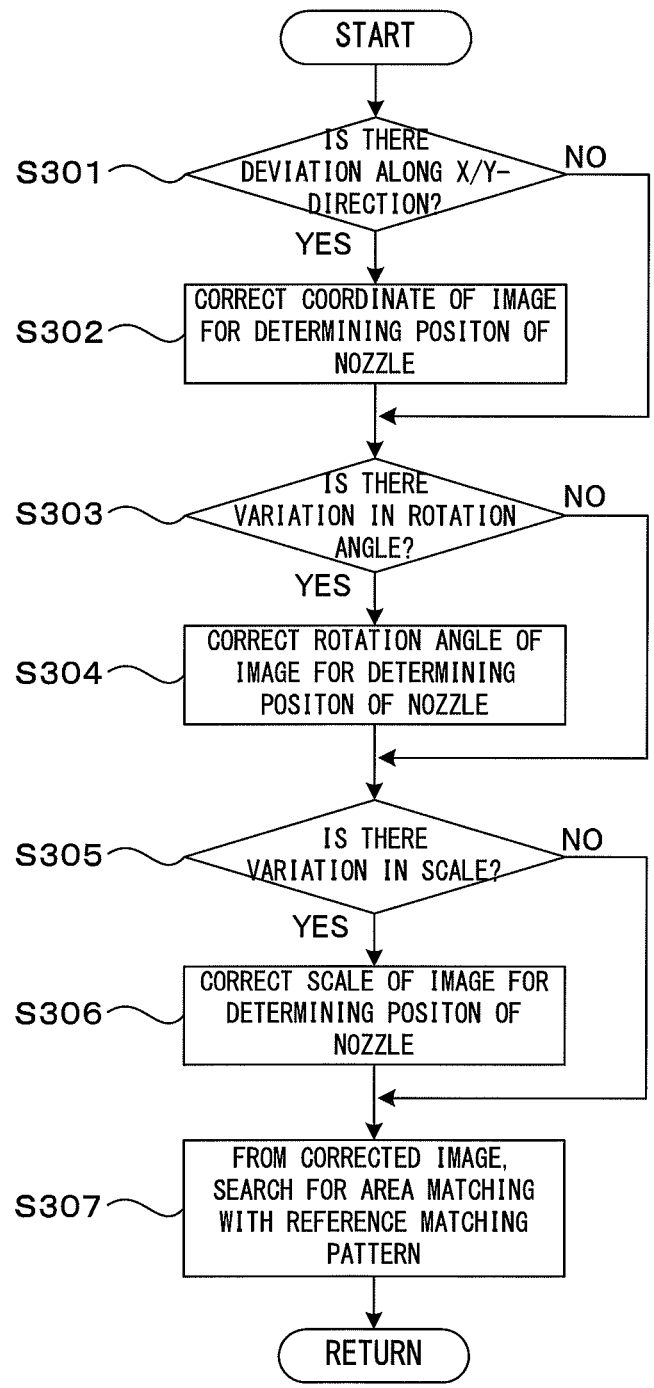
FIG. 12 is a flow chart which shows a method for directly obtaining the position of the nozzle.

FIG. 12 is a flow chart which shows a method for directly obtaining the position of the nozzle. The basic concept is the same as the processing shown in FIG. 11. First, whether the camera 72 is deviated in the X-direction or the Y-direction is determined based upon the position information concerning the alignment marks which is stored in the memory 82 (Step S301). When there is deviation in any one of the directions, the coordinate values of each pixel contained in the image Im5 for judging the position of the nozzle are corrected in accordance with the amount of deviation in that direction (Step S302). This is equivalent to cancelling of deviation by shifting the image Im5 for the amount of deviation of the camera 72. Step S302 is skipped in the absence of deviation. Correction of the image for judgement the position of the nozzle which corresponds to inclination of the camera 72 and changes in the scale (Step S303 through Step S306) is the same as Step S203 through Step S206 which are shown in FIG. 11.

Through pattern matching which uses the image for judging the position of the nozzle from which the influence of deviation of the camera 72 is removed by such correction, an area which matches with the reference matching pattern stored in the memory 82 is searched for (Step S307). The detected position of this area is indicative of the position of the nozzle 43 within the processing space SP. By this method as well, a similar effect to the effect according to the embodiment above is obtained.

As described above, in this embodiment, the nozzles 33, 43 and 53 function as the "movable part" and the "processing device" of the invention. Meanwhile the alignment marks 61 through 64 correspond to the "reference section" of the invention. Further, the images Im1, Im2, Im4, Im5 and the like each correspond to the "original image" of the invention, among which the images Im1 and Im4 correspond to the "reference image" of the invention.

The camera 72 functions as the "imaging device" of the invention, while the image processor 86 functions as the "image processor" and the "position detector" of the invention. The illuminator 71 functions as the "illuminator" of the invention. These act as one and accordingly function as the "position detection apparatus" and the "position detector" of the invention.

In the embodiment above, the spin chuck 11 functions as the "holder" of the invention and the memory 82 functions as the "memory" of the invention. The substrate processing unit 1A or the like which comprises these elements, the position detector described above, the chamber 90, the nozzles 33, 43 and 53 which serve as the "processing device" corresponds to the "substrate processing apparatus" of the invention.

The invention is not limited to the embodiment described above but may be modified in various manners in addition to the embodiments above, to the extent not deviating from the object of the invention. For instance, although the camera 72 shoots before and after the nozzle 43 moves to the processing position according to the embodiment above, imaging may be performed only once. For the purpose of confirming the condition in which the substrate W is held, it is necessary in the embodiment above to detect the positions of the alignment marks, which serve as the position references, before the substrate W rotates and the nozzle 43 moves to the processing position. Therefore, one imaging is needed before the nozzle moves and another imaging is needed for confirmation of the position of the nozzle after the nozzle movement.

Meanwhile, when it is not necessary to confirm the condition in which the substrate W is held for instance or when how the substrate W is held is to be confirmed after the nozzle 43 has moved to the processing position, imaging may be performed only in the condition that the nozzle 43 has moved to the processing position. The amount of deviation of the camera 72 may be estimated from the result of detection of the positions of the alignment marks 61 through 64 within the shot image, correction which cancels deviation may be carried out in accordance with a similar principle to that described earlier, and the postures of the substrate W and the nozzle 43 may be detected.

Further, in the embodiment above, the alignment marks 61 through 64 provided inside the chamber 90 are used as the "reference section" of the invention. However, anything else the position of which is fixed inside the chamber 90 and can be detected based upon imaging with the camera 72 and the image may be used as the "reference section" of the invention. For instance any other member which is fixed inside the chamber 90, in its entirety or partially, may be used as the reference section, or alternatively, the substrate W may be used as the reference section as long as the substrate W is securely held. That is, where the position of the center, inclination and the size of the substrate W denoted at the solid line are expressed relative to the area denoted at the dotted line in FIG. 8A, these values indicate the amount of deviation of the camera 72 when the substrate W is held properly.

The embodiment above is to embody the technical idea of detecting the position of the nozzle within the image for judging the position of the nozzle which is obtained by correcting the original image in accordance with the result of detection of the positions of the alignment marks. Instead of this, the technical idea that the position of the nozzle detected from the uncorrected original image is corrected in accordance with the result of detection of the positions of the alignment marks also realizes detection of the position of the nozzle within the processing space SP.

Figures 13A, 13B, 13C:
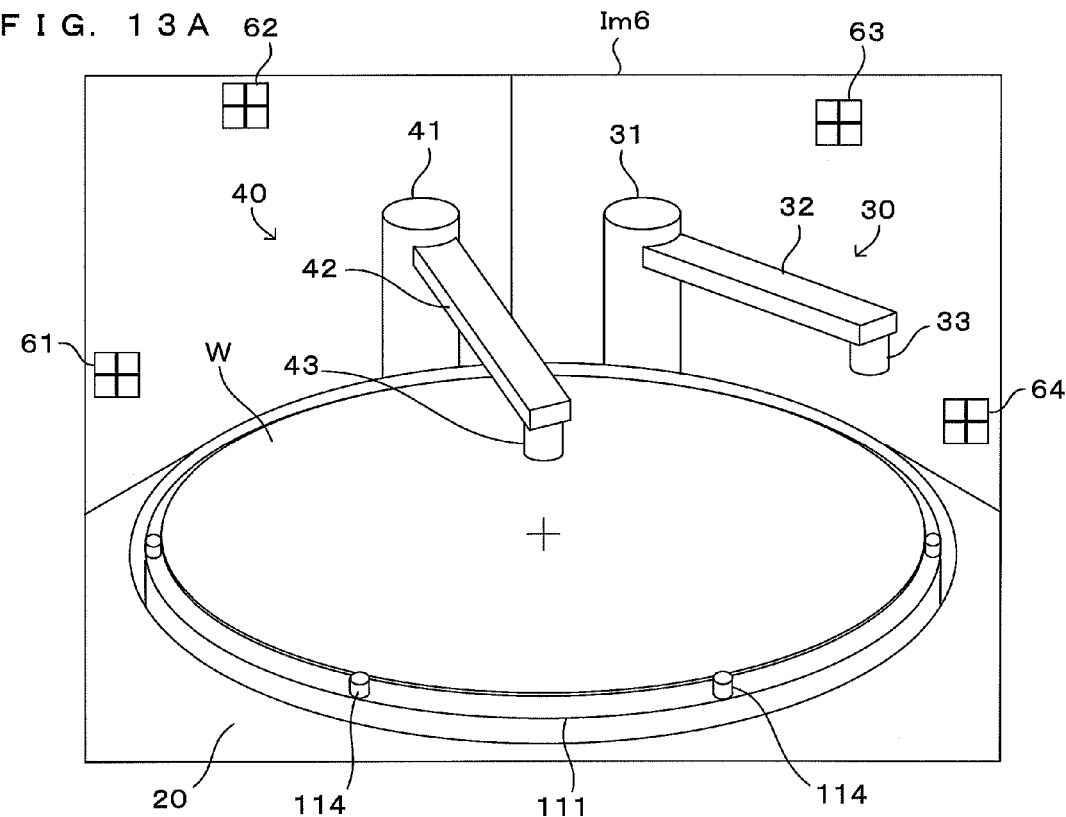
FIGS. 13A through 13C are a first set of drawings showing the nozzle position detection method according to other embodiment.

FIGS. 13A through 13C, FIGS. 14A through 14C and are FIGS. 15A and 15B are drawings which show the nozzle position detection method according to other embodiments. FIG. 13A shows an example of an image which is shot in an ideal condition that the nozzle 43 is set to the processing position and both the camera 72 and the nozzle 43 are set at the appropriate positions as in FIG. 9. As shown in FIG. 13B, the positions and the postures of the alignment marks 61 through 64 and the nozzle 43 within this image Im6 are stored as position information within the memory 82 in advance. This concept is similar to that shown in FIG. 7B, and the numerical values may be actually measured values or calculated values.

From these numerical values, the relationship among the positions of the nozzle 43 and the alignment marks 61 through 64 relative to each other within the image Im6 is calculated. Describing more specifically, as shown in FIG. 13C, for each item, a difference between the position information concerning the nozzle 43 and the position information concerning each one of the alignment marks 61 through 64 is calculated. This is similarly practiced on the other members as well, such as the nozzles 33 and 53, the positions of which need be detected.

Figures 14A, 14B, 14C:
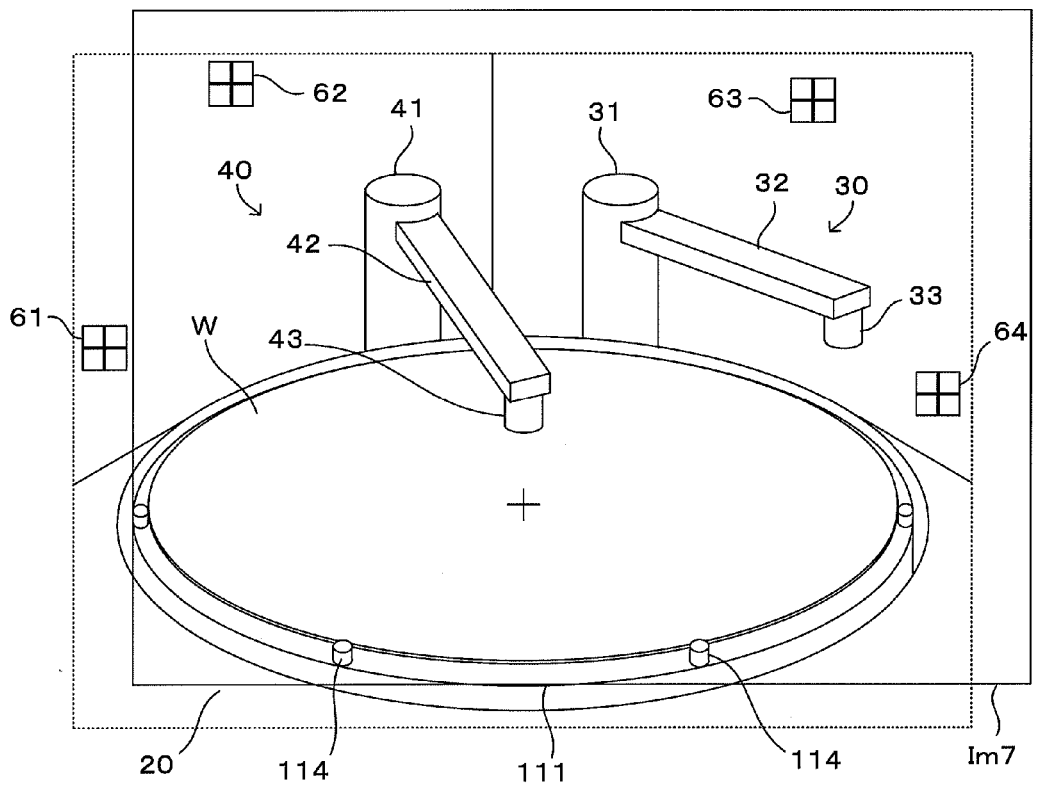
FIGS. 14A through 14C are a second set of drawings showing the nozzle position detection method according to another embodiment.

FIG. 14A shows an example of an image which potentially contains deviation of the camera 27 and the nozzle 43, and this image corresponds to an image which is shot during the processing of the substrate. An example is now considered that as shown in FIG. 14A, the imaging direction of the camera 72 is deviated toward above and the right-hand side and the imaging range in which the image Im7 is shot is therefore deviated from the imaging range in an ideal condition (denoted by the dotted lines). From the image Im7, the alignment marks 61 through 64 (which are indicated as MARKS 1 through 4 as well in the figures) and the nozzle 43 are detected and the position information regarding the alignment marks 61 through 64 and the nozzle 43 is obtained. FIG. 14B shows an example of thus obtained position information. Further, for each alignment mark and each item, a difference between the position information concerning the nozzle 43 and the position information concerning the alignment mark is calculated. FIG. 14C shows an example of thus calculated numerical values.

In the image Im7, due to deviation of the camera 72, the position information regarding the alignment marks and the nozzle shown in FIG. 14B is different from that shown in FIG. 13B. The alignment mark 61 (MARK 1) is outside the imaging range for the image Im7 and the position information is unavailable.

Meanwhile, the numerical values of the information representing the positions of the alignment marks and the nozzle 43 relative to each other matches with those shown in FIG. 13C, except for the alignment mark 61 which cannot be detected. In such a situation, despite deviation of the camera 72, it is possible to determine that the nozzle 43 itself is correctly set to the processing position.

FIGS. 15A and 15B show other example the position information concerning the alignment marks and the nozzle 43 and differences. It is understood in this example that the camera 72 has deviation since the position information concerning the respective alignment marks shown in FIG. 15A is different from the numerical values shown in FIG. 13B. Further, it is understood that the nozzle 43 as well has deviation from the processing position at which the nozzle 43 should be located, since the information regarding the position of the nozzle 43 relative to the respective alignment marks shown in FIG. 15B is different from the numerical values shown in FIG. 13C.

In addition, when the position information regarding the respective alignment marks approximately coincides with the numerical values shown in FIG. 13B and the position information concerning the nozzle 43 alone is different, it is understood that the camera 72 does not have deviation but the nozzle 43 has deviation. When neither the camera 72 nor the nozzle 43 is deviated, the detected position information naturally contains only such differences which are within the tolerable range from the numerical values shown in FIG. 13B and FIG. 13C.

It is thus possible to separate deviation of the camera 72 from deviation of the nozzle 43 and detect such deviation in accordance with the position information regarding the respective alignment marks and the position information regarding the nozzle within the image Im7. In this example, the image Im7 corresponds to the "original image" of the invention. As the result of detection of the position of the nozzle 43 is corrected according to the amount of deviation of the camera 72 when deviation of the camera 72 is detected, it is possible to correctly detect the position of the nozzle 43 within the processing space SP while eliminating deviation of the camera 72. The correction processing according to the embodiment above may be executed as needed after simplified detection of deviation of the camera 72 and deviation of the nozzle 43 in this manner.

Although the embodiment above is application of the invention to detection of the position of the nozzle which is so structured that the nozzle can move inside the chamber 90, the invention is applicable also to detection of the positions of the movable members other than the nozzle. Further, the invention may be applied to various types of apparatuses in which movable members are disposed inside a chamber, in addition to the apparatus in which the nozzle is opposed to the substrate which is loaded into inside the chamber as in the embodiment above.

The invention is applicable to various types of apparatuses which comprise a movable part disposed inside a chamber and in which the position of the movable part needs be detected.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A position detection apparatus which detects a position of a movable part which is so disposed to move within processing space inside a chamber, comprising:
    an imaging device which shoots a reference section and the movable part, thereby obtaining an original image, the reference section being disposed inside the chamber and a position of which inside the chamber being known;
    an image processor which performs image processing of the original image, thereby detecting the movable part and the reference section within the original image; and
    the image processor further detects the position of the movable part within the processing space based upon position information which is indicative of positions of the movable part and the reference section detected within the original image,
    wherein the position information concerning the reference section is information which is indicative of a relative position relative to the position of the reference section within a reference image which corresponds to the original image, wherein the reference image contains the reference section as it is when the imaging device is set to an appropriate position.

2. The position detection apparatus of claim 1, wherein the image processor detects the movable part within a corrected image which is obtained by correcting the original image which contains the movable part in accordance with the position information concerning the reference section.

3. The position detection apparatus of claim 1, wherein the image processor detects the movable part within a partial area of the original image containing the movable part which is specified by the position information concerning the reference section.

4. The position detection apparatus of claim 1, wherein the image processor corrects the position information concerning the movable part based upon the position information concerning the reference section, thereby detecting the position of the movable part within the processing space.

5. The position detection apparatus of claim 1, wherein the position detector image processor detects a relative position of the movable part relative to the position of the movable part within a reference image as it is when the imaging device and the movable part are set to appropriate positions.

6. The position detection apparatus of claim 1, wherein an alignment mark which serves as the reference section is disposed inside the chamber.

7. The position detection apparatus of claim 1, comprising an illuminator which makes illumination light impinge upon the reference section, wherein the imaging device is disposed at such a position which receives reflected light or transmitted light of the illumination light which is created by the reference section.

8. The position detection apparatus of claim 7, wherein the imaging device is disposed at such a position which receives the reflected light of the illumination light which is created by the reference section, and the reference section is made partially of a retroreflective material.

9. The position detection apparatus of claim 1, wherein the position information concerning the reference section contains at least one of information which is indicative of coordinates of the reference section within the original image, information which is indicative of an amount of inclination of the reference section within the original image and information which is indicative of a size of the reference section within the original image.

10. A substrate processing apparatus, comprising:
    a chamber which has a processing space inside;
    a holder which holds a substrate to be processed inside the chamber;
    a processing device which is so structured to be able to move inside the chamber and which performs predetermined processing of the substrate; and
    a position detector which comprises the position detection apparatus of claim 1, the position detection apparatus detecting a position of the processing device, which is regarded as the movable part, inside the chamber.

11. The substrate processing apparatus of claim 10, comprising a controller which prohibits the processing device from performing the processing of the substrate when the position of the processing device detected by the position detector is not within a predetermined appropriate range to prevent inappropriate processing of the substrate.

12. The substrate processing apparatus of claim 11, wherein the controller prohibits the processing device from performing the processing of the substrate when the position of the reference section detected within the original image is not within a predetermined appropriate range to prevent inappropriate processing of the substrate.

13. The substrate processing apparatus of claim 10, comprising a memory which stores the position information concerning the reference section within the reference image which corresponds to the original image as it is when the imaging device is set to an appropriate position.

14. A position detection method of detecting a position of a movable part which is movable within processing space inside a chamber, comprising:
    an imaging step of shooting a reference section and the movable part, thereby obtaining an original image, the reference section being disposed inside the chamber in advance;

an image processing step of executing image processing for detecting the movable part and the reference section from the original image; and a position detecting step of detecting the position of the movable part within the processing space based upon position information which is indicative of positions of the movable part and the reference section detected within the original image, wherein the position information concerning the reference section is information which is indicative of a relative position relative to the position of the reference section within a reference image which corresponds to the original image, wherein the reference image contains the reference section as it is when the imaging device is set to an appropriate position.

15. The position detection method of claim 14, wherein at the image processing step, the original image containing the movable part is corrected based upon the position information concerning the reference section and the movable part is detected within the corrected image.

16. The position detection method of claim 14, wherein at the image processing step, the movable part is detected within a partial area of the original image containing the movable part which is specified in accordance with the position information concerning the reference section.

17. The position detection method of claim 14, wherein at the position detecting step, the position information concerning the movable part is corrected in accordance with the position information concerning the reference section, thereby detecting the position of the movable part within the processing space.

18. The position detection method of claim 14, wherein the position information concerning the reference section contains at least one of information which is indicative of coordinates of the reference section within the original image, information which is indicative of an amount of inclination of the reference section within the original image and information which is indicative of a size of the reference section within the original image.

19. A substrate processing method, comprising the steps of:

holding a substrate to be processed within processing space inside a chamber and setting a processing device which is so structured to be able to move inside the chamber, to a predetermined position;

executing the position detection method of claim 14, detecting the position of the processing device inside the chamber while regarding the processing device as the movable part, and verifying the position of the processing device; and performing predetermined processing of the substrate using the processing device.

20. The substrate processing method of claim 19, wherein the processing device stops processing when an amount of deviation of the processing device from the predetermined position is beyond a set amount.

* * * * *